United States Patent
Yakura et al.

(10) Patent No.: US 6,481,898 B1
(45) Date of Patent: Nov. 19, 2002

(54) BALL BEARING

(75) Inventors: Kenji Yakura, Fujisawa (JP); Hirotoshi Aramaki, Fujisawa (JP); Yukio Ooura, Fujisawa (JP); Akio Fujii, Fujisawa (JP); Sumio Sugita, Fujisawa (JP); Dai Kinno, Fujisawa (JP); Shoji Noguchi, Fujisawa (JP); Koji Ueda, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/601,956
(22) PCT Filed: Dec. 22, 1999
(86) PCT No.: PCT/JP99/07235
§ 371 (c)(1),
(2), (4) Date: Aug. 10, 2000
(87) PCT Pub. No.: WO00/37813
PCT Pub. Date: Jun. 29, 2000

(30) Foreign Application Priority Data

Jan. 20, 1998 (JP) ............................... 10-8778
Dec. 22, 1998 (JP) ............................ 10-365036
Jan. 19, 1999 (JP) ............................ 11-010687
Jun. 21, 1999 (JP) ............................ 11-174009

(51) Int. Cl.$^7$ ................................ F16C 33/58
(52) U.S. Cl. ................ 384/516; 384/450; 384/492
(58) Field of Search ......................... 384/516, 513, 384/450, 492

(56) References Cited

U.S. PATENT DOCUMENTS 4,334,721 A  *  6/1982  Satoh et al. ............... 384/450
5,228,786 A  *  7/1993  Tanimoto et al. .......... 384/492
5,501,530 A  *  3/1996  Nagai et al. ............... 384/516
5,593,234 A  *  1/1997  Liston ....................... 384/492
5,700,546 A  * 12/1997  Fujii et al. ............. 384/492 X
6,116,786 A  *  9/2000  Takata et al. ............. 384/516

FOREIGN PATENT DOCUMENTS

| JP | 62-24025 | 2/1987 |
| JP | 62-188816 | 8/1987 |
| JP | 10-246239 | 9/1988 |
| JP | 64-65327 | 3/1989 |
| JP | 7-238938 | 9/1995 |

* cited by examiner

Primary Examiner—Thomas R. Hannon
(74) Attorney, Agent, or Firm—Crowell & Moring LLP

(57) ABSTRACT

A ball bearing in which the heat value in an inner ring is decreased and the heat value in an outer ring is brought closer to the heat value in the inner ring by making the radius of curvature for the inner ring groove larger, and defining the radius of curvature for the outer ring groove as 50.5% to 53.0% of the ball diameter. The arrangement of the present invention suppresses the heat value in the entire ball bearing and extends the bearing life at a reduced cost without using a large flow rate lubrication method or a preloading method such as constant preloading. In addition, a decrease in heat generation, seizing resistance and wear resistance can be attained further by optimizing a relation between the raceway groove and the ball diameter, by optimizing the number of balls, by controlling the ingredient composition for the material of the bearing ring, and by forming a hard deposition film on the surface of the raceway groove. Thus, according to the present invention, a ball bearing having a long life is provided even during high speed rotation at a dmn value of 2,000,000 or more.

34 Claims, 17 Drawing Sheets

INGREDIENT TABLE (wt%)

| INGREDIENT / STEEL SPECIES | C | Si | Mo | Cr | SURFACE C TEMPERATURE | SURFACE N TEMPERATURE |
|---|---|---|---|---|---|---|
| STEEL A | 0.94 | 1.02 | 0.88 | 1.52 | 1.15 | 0.23 |
| STEEL B (SUJ2) | 1.01 | 0.24 | — | 1.48 | 1.01 | — |

EVALUATION FOR THE PERFORMANCE OF EACH BEARING AT $2 \times 10^4$ rpm

|  | STEEL SPECIES | CURVATURE FOR INNER RING GROOVE R1 | CURVATURE FOR INNER RING GROOVE R2 | TEMPERATURE ELEVATION VALUE IN OUTER RING (°C) |
|---|---|---|---|---|
| EXAMPLE 1 | STEEL A | 0.55d | 0.52d | 27 |
| COMP. EXAMPLE 1 | STEEL B | 0.52d | 0.52d | 45 |
| COMP. EXAMPLE 2 | STEEL A | 0.52d | 0.52d | 38 |
| COMP. EXAMPLE 3 | STEEL B | 0.55d | 0.52d | 35 |

BALL BEARING

BACKGROUND AND SUMMARY OF THE INVENTION

The present invention relates to a ball bearing used for various types of machine tools.

In recent years, speed of main spindles in machine tools has been increased for the improvement of working efficiency and productivity and, correspondingly, the number of rotation of ball bearings for use in machine tools has also been increased.

In general, when the ball bearing rotates at a high speed, large sliding is caused at the contact point between a ball and a raceway surface by spin or gyro movement. Further, the clearance in the bearing is reduced under the effect of centrifugal force exerting on an inner ring or a ball and a contact pressure between the ball and the raceway surface increases, to increase the heat value which leads to various disadvantages such as temperature elevation or seizing and progress of excessive wearing in the ball bearing.

As a countermeasure for suppressing the disadvantages, it has been adopted to decrease the diameter of the ball or to make the material of the ball with light weight ceramics to thereby moderate the increase of the surface pressure due to the centrifugal force of the ball. Further, it has also been disclosed a method of suppressing the change of the clearance in the bearing by making the material of the inner ring with a material of lower linear expansion coefficient than the material for the outer ring (Japanese Unexamined Patent Publication No. 62-24025).

When a ball bearing applied with such a countermeasure is used for a main spindle for use in machine tools, an operation is possible up to maximum dmn value of 1,500,000 to 2,000,000 showing the limiting speed. However, only by individual countermeasures in the prior art such as decrease of the ball diameter or use of ceramic material for the ball the limit for the dmn value is up to 2,000,000, and seizing or wear due to increase of the contact pressure occurs if the value is exceeded.

Particularly, it is difficult to increase the speed under slight amount oil lubrication such as grease lubrication, oil air lubrication or oil mist lubrication used frequently in bearings for use in machine tools, in which seizing caused by breakage of the oil films and increase of the surface pressure in the bearing becomes remarkable.

As the counter measure, the effect of temperature elevation can not but be prevented by increasing the amount of lubrication oil or changing the preload system from a constant position preloading system tending to increase the contact pressure due to the temperature elevation to a constant pressure preloading system in which the contact pressure is kept substantially constant free from the effect of the temperature change but this inevitably increases the cost.

The present invention has been accomplished for overcoming such disadvantages in the prior art and it is an object thereof to provide a ball bearing of a reduced cost, generating less heat and having long life, capable of adopting a slight amount oil lubrication system and a constant position preloading system which is advantageous for reduction of the cost and capable of attaining high seizing resistance and wear resistance even at high speed rotation of dmn value of 2000,000 or higher.

The ball bearing of the present invention includes balls disposed so as to roll between an inner ring and an outer ring in which a groove of an arcuate cross section is formed in a circumferential direction to each of the surfaces of the inner ring and the outer ring in contact with the balls, wherein the arcuate groove of the inner ring is formed such that the radius of curvature thereof is within a range of 52.5% or more and 60.0% or less of the diameter of the ball, and the arcuate groove of the outer ring is formed such that the radius of curvature thereof is within a range of 50.5% or more and 53.0% or less of the diameter of the ball.

When the radius of curvature of the groove in the inner ring is defined as within a range from 52.5 to 60.0% and the radius of curvature of the groove in the outer ring is defined as within a range from 50.5 to 53.0%, the heat value in the inner ring can be decreased and the heat value in the outer ring can be made closer to that of the inner ring and, thus, the heat value in the entire ball bearing can be suppressed. Therefore, seizing of the ball bearing in a high speed rotational region can be prevented without adopting a large flow rate lubrication method or a preloading method such as constant pressure preloading.

In this case, the radius of curvature for the inner ring is preferably formed within a range of 52.5% or more and 57.0% or less of the ball diameter. This can reliably suppress the heat generation in the inner ring and the heat value in the entire ball bearing can be suppressed more reliably.

Further, the invention provides a ball bearing wherein the diameter of the ball is defined as 0.32 to 0.60 times the value for: (outer diameter of outer ring—inner diameter of inner ring)/2.

Assuming the ball diameter/{(outer diameter of outer ring—inner diameter of inner ring)/2}=α, decrease of value α means that the ball diameter is decreased relative to the radial cross section of the ball bearing, and this has a close concern with the heat value in the ball bearing. When the value α is controlled within a range from 0.32 to 0.60, the heat value in the ball bearing can be suppressed. If α is less than 0.32, the ball diameter is excessively small making it necessary to decrease the wall thickness of a cage and, accordingly, the collision force and the hoop stress exerting from the ball to the cage are increased during high speed rotation, making it difficult for the design of the case capable of withstanding them. Further since the ball diameter is small, the contact area with the groove of the outer and inner rings is excessively small to increase the contact pressure and thus increase the heat value, which causes oil film breakage or the like leading to deterioration of the bearing life. On the other hand, if α exceeds 0.60, the ball diameter is excessively large making the centrifugal force exerted on the ball excessively large during high speed rotation and, particularly, surface pressure increase with respective to the outer ring groove to result in lowering of the life, as well as spin sliding increases at the contact point between the ball and the raceway groove and, accordingly, the heat value increases to reduce the bearing clearance, increase the surface pressure and result in oil film breakage to cause seizing and deteriorate the life. Accordingly, the allowable range for the diameter of the ball is defined within a range of α from 0.32 to 0.60 at the maximum in the present invention.

Then, in a more preferred embodiment, the range is further narrowed such that the ball diameter is from 0.35 α to 0.55 α and, further, the ball diameter is from 0.39 α to 0.48 α.

Further, the invention to a restriction for the number of balls and provides a ball bearing of the invention wherein the number of balls satisfies a relation: $1.1 \leq \{\text{pitch circle diameter} \times \sin(180/\text{number of balls})\}/\text{ball diameter} \leq 2.0$ Assuming {pitch circle diameter×sin (180/number of balls)}/ball diameter=β, the value β is from 1.1 to 2.0.

Decrease of value β means that the number of balls is increased in view of the design since the ball pitch space is decreased on a pitch circle diameter of a ball bearing. If β is less than 1.1, since the number of balls increases, the circumferential width for the bar of the cage has to be narrowed and, as a result, impact from the ball increases more as the rotational speed is higher tending to break the bars of the cage. Further, increase in the number of balls increases the stirring resistance of the lubricant in the bearing to increase the heat value. On the other hand, the value β in excess of 2.0 corresponds to excessive decrease for the number of balls and, since the load on the ball increases to increase the contact pressure, the spin sliding increases to increase the heat value, which leads to oil film breakage to deteriorate the bearing life.

Accordingly in the present invention, the value β is defined within a range from 1.1 to 2.0.

Further, in the invention the value β is defined as form 1.2 to 1.8 as a more preferred embodiment.

The invention intends to make an improvement in view of the material for the inner and outer rings in order to obtain a ball bearing for use in machine tools which generates less heat and suffers from less seizing, and provides a ball bearing wherein at least one of the inner ring and the outer ring comprises a steel containing, as the weight ratio, 0.2 to 1.2% of C, 0.7 to 1.5% of Si, 0.5 to 1.5% of Mo, 0.5 to 2.5% of Cr, and the balance of Fe and inevitable impurity elements, in which the surface carbon concentration is from 0.8 to 1.3% and the surface nitrogen concentration is from 0.2 to 0.8%.

Since a large load is applied between the ball and the outer ring due to the centrifugal force exerting on the ball during a high speed rotation, the state between the ball and the outer ring approaches complete rolling contact and sliding between the ball and the inner ring increases. The heat value in the bearing during high speed rotation greatly depends on the friction caused by sliding between the ball and the inner ring. Accordingly, it can be expected to attain further lowered heat generation by the use of a material of low friction coefficient and, particularly, a material of low friction coefficient under high pressure surface and high shearing condition during high speed rotation of the ball bearing. In particular, when an inner ring having large radius of curvature for the groove is used, since the contact pressure is remarkably increased on the inner ring with large sliding, a material having a low friction characteristic under high surface pressure is advantageous.

With a view point described above, the material used in the present invention can attain low friction characteristics under high speed sliding and high surface pressure by suppressing localized adhesion by the reinforcing effect for the matrix strength at a high temperature and can realize further lowered heat generation design as the bearing and, particularly, it is extremely effective in a case of slight amount lubrication with less cooling effect such as oil-air, oil-mist lubrication or grease lubrication.

The critical meanings for the effective range of each of the ingredient elements constituting the ball bearing according to the present invention will be described later.

The invention intends to reinforce the wear resistance on the surface of the raceway groove in order to improve the bearing life further at a high speed and it provides a ball bearing wherein a hard deposition film of 0.05 to 8 μm thickness is applied to the raceway surface of at least one of the inner ring and the outer ring.

This can improve the wear resistance during high speed rotation with the dmn value of 2,000,000 or more at which the sliding or the surface pressure at the contact point between the ball and the raceway surface increases. The thickness of the hard deposition film is preferably from 0.1 to 5 μm and, more preferably, from 0.5 to 3 μm. At a film thickness of less than 0.05 μm, the substrate surface is exposed greatly to reduce the performance of the hard deposition film and, as a result, the effect of improving the sliding property and the wear resistance is decreased. On the other hand, if it is more than 8 μm, internal stress of the reaction product is increased to deteriorate the adhesion with the substrate tissue.

Further, the present invention provides a ball bearing wherein the ball is made of ceramics.

Ceramics have high modulus of elasticity compared with steels and can suppress the contact area at which the ball and inner and outer rings are in contact with each other. Accordingly, it is possible to more reliably suppress the amount of heat generated from the entire ball bearing.

Further, ceramics have lower density and higher heat resistance compared with steels and they can be free from the effect of centrifugal force further as the speed goes higher. In general, the outer ring undergoes a larger effect of centrifugal force of the ball than the inner ring, tending to increase the temperature in the bearing but such tendency is moderated by the use of a ceramic ball. According to the experiment made by the present inventor (to be described later), it could be confirmed that ball bearings made of steel balls (SUJ2) cause seizing at about 1,400,000 dmn, whereas ball bearings made of ceramic ball ($Si_3N_4$) could sufficiently withstand even for 2060000 dmn (25000 rpm).

EXPLANATIONS OF REFERENCE NUMERALS

1 . . . ball bearing,
2 . . . inner ring (rotational ring),
3 . . . outer ring (fixed ring),
4 . . . ball,
6 . . . outer circumferential surface of an inner ring (contact surface),
7 . . . inner circumferential surface of an outer ring (contact surface),
8 . . . inner ring groove,
9 . . . outer ring groove.

DETAILED DESCRIPTION OF THE DRAWINGS

Preferred embodiments of the present invention are to be described more in details with reference to the drawings.

At first, description is to be made for the radius of curvature of a raceway groove and the ball diameter of the present invention.

It has been known that the heat value of a bearing in a high speed rotation region is smaller as the contact pressure at the contact surface between each of the inner and outer rings and each of the balls and the speed of the ball that slides on the raceway groove are smaller. Since the sliding of the ball increases at the end of the contact portion having a large contact area, the heat value is not decreased by merely lowering the contact pressure but the radius of curvature for the raceway groove has to be set optimally. In the ball bearing according to the present invention, the heat value in the inner ring is decreased by defining the radius of curvature for the groove of the outer ring as 50.5% or more and 53.0% or less of the ball diameter, and the heat value in the entire ball bearing is suppressed by making the amount heat generation in the outer ring closer to that in the inner ring, by which seizing of the ball bearing in a high speed rotational region can be prevented without using a large flow rate lubrication system or a preload system such as constant preloading.

Descriptions are to be made specifically.

Figure 1:
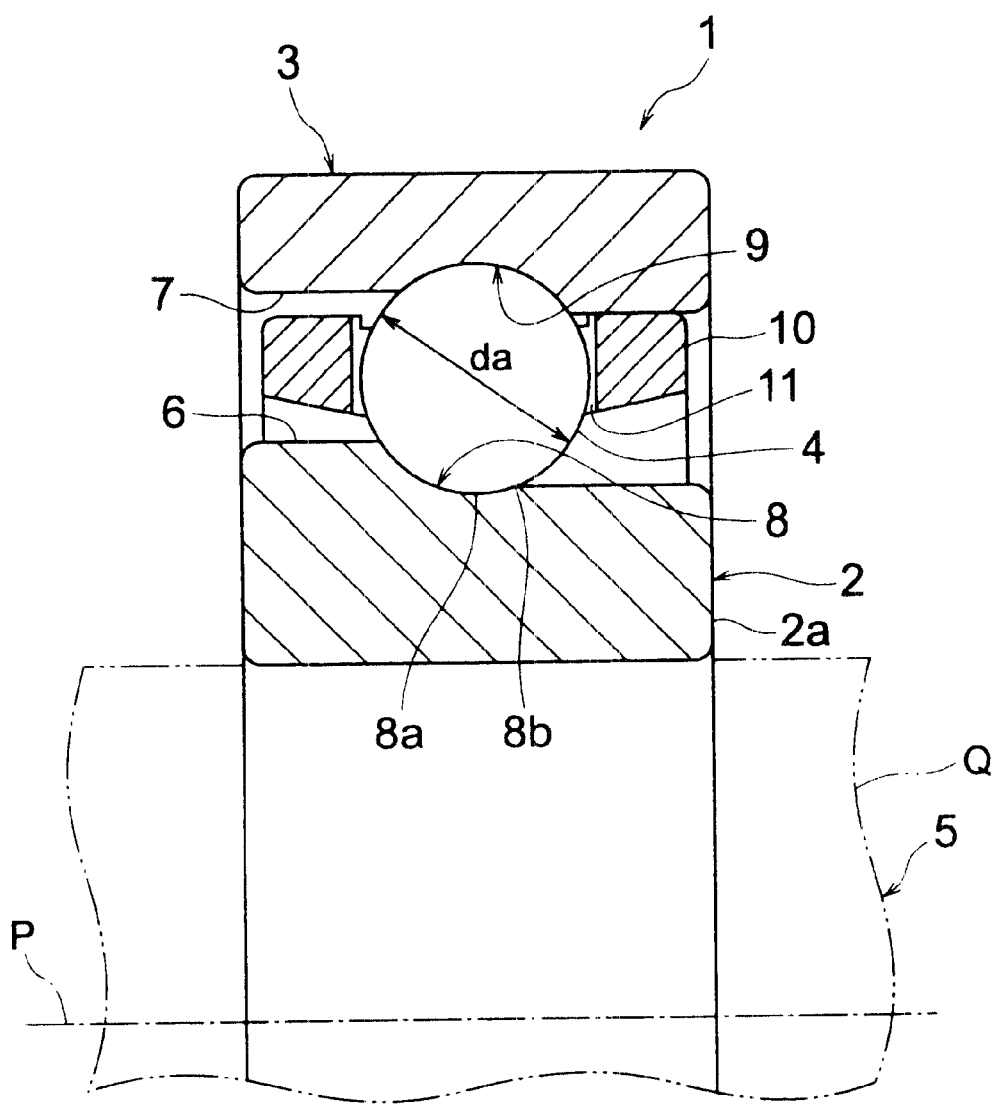
FIG. 1 is a cross sectional view showing, in an enlarged scale, a portion of a ball bearing according to the present invention.

FIG. 1 is a cross sectional view for a main portion of one embodiment of a ball bearing according to the present invention. A ball bearing 1 is a rolling bearing for use in various types of machines used in the industrial fields such as of automobiles, electricity, information and iron and steels, various types of machine tools and industrial machines, and it has an inner ring 2 and an outer ring 3 as bearing rings, balls 4 as rolling elements and a cage 10. The inner ring 2 is formed into a circular ring shape in which a rotational shaft 5 shown by a dotted chain Q in the drawing is fixed to the inner circumferential surface thereof, and it is made rotatable integrally with the rotational shaft 5 relative to the outer ring 3 around an axis P of the rotational shaft 5. The outer ring 3 is formed into a circular ring shape having an inner diameter larger than the outer diameter of the inner ring 2.

Bearing rings such as inner and outer rings 2 and 3 are usually constituted with bearing steels such as SUJ2 (high carbon chromium bearing steel). The bearing steel such as SUJ2 is used at a relatively low temperature, because the hardness is remarkably lowered to shorten the life at a high temperature. Therefore, in a case where rotation at a higher speed is required, the contact pressure or the sliding of the ball increase at the contact surface at which the ball 4 and the inner and the outer rings 2 and 3 are in contact with each other, to generate heat and increase the temperature locally. Therefore, it is desirable that the bearing ring is constituted with a material of excellent heat resistance and wear resistance. The material for the bearing ring and the like is to be described with respect to other embodiment.

The ball 4 is formed into a spherical shape, which is in contact with the outer circumferential surface 6 of the inner ring 2 and the inner circumferential surface 7 of the outer ring 3 and disposed so as to roll between the inner ring 2 and the outer ring 3. The ball 4 is adapted such that relative rotation between the inner ring 2 and the outer ring 3 is not transmitted to the outer ring 3 and the inner ring 2 to each other.

The ball 4 is preferably constituted with steels of excellent heat resistance and wear resistance, or ceramics such as $Si_3N_4$ (silicon nitride), SiC (silicon carbide) or $Al_2O_3$ (aluminum oxide). In a case where the ball 4 is constituted with ceramics such as $Si_3N_4$, SiC or $Al_2O_3$, the area of the contact surface at which the ball and the inner ring 2 and the outer ring 3 are in contact with each other in the grooves 8 and 9 to be described later can be suppressed and sliding of the ball 4 at the contact surface described above can be suppressed by the high modulus of elasticity of the ceramics.

The cage 10 is formed into a circular ring shape having an inner diameter greater than the outer diameter of the inner ring 2 and the outer diameter smaller than the inner diameter of the outer ring 3. The cage 10 has pockets 11 for retaining the balls 4 in a nearly equal circumferential distance. The cage 10 retains the balls 4 between the inner ring 2 and the outer ring 3 in a state of retaining the balls 4 in the pockets 11.

The outer circumferential surface 6 of the inner ring 2 and the inner circumferential surface 7 of the outer ring 3 are formed with an outer ring groove 8 and an inner ring groove 9 each of an arcuate cross section, respectively, along the circumferential direction. The inner ring groove 8 and the outer ring groove 9 are formed each into a groove of such a shape as conforming the ball 4, respectively, and the balls 4 roll in the grooves 8 and 9.

The inner ring groove 8 is formed such that the radius of curvature thereof is within a range from 52.5% or more and 60.0% or less of the ball diameter da, preferably, in a range from 52.5% or more and 57.0% or less of the ball diameter da.

The outer ring groove 9 is formed such that the radius of curvature thereof is within a range from 50.5% or more and 53.0% or less of the ball diameter da, preferably, in a range from 50.5% or more and 52.5% or less of the ball diameter da. A further preferred radius of curvature for the outer ring groove is within a range from 50.75% or more and 52% less of the ball diameter da. In the subsequent description, sometimes, the ratio between the radius of the inner ring groove and the ball diameter is referred to as an inner ring groove radius ratio and denoted as (inner ring groove radius/ball diameter=Di), while the ratio between the radius of the outer ring groove and the ball diameter is referred to as an outer ring groove radius ratio and denoted as (outer ring groove radius/ball diameter=De).

In the outer circumferential surface 6 of the inner ring 2, the outer diameter of the inner ring 2 is formed gradually smaller from a point 8b along the axis P to one end face 2a of the inner ring 2 (end face situated on the right in the illustrated embodiment). The point 8b is an engaging portion so as not to detach the inner and outer rings 2 and 3 and the ball 4 from the groove bottom 8a of the inner ring groove 8. Each of the outer circumference surface 6 of the inner ring 2 and the inner circumferential surface 7 of the outer ring 3 constitutes the surface at which the inner and outer rings 2, 3 and the ball 4 are in contact with each other.

With the constitution as described above, since the radius of curvature for the inner ring groove 8 is made larger than 52.0% of the ball diameter da which is used generally, the heat value in the inner ring 2 can be decreased and the heat value in the outer ring 3 can be made closer to that in the inner ring 2. This can make the heat value in the outer ring 3 and the heat value in the inner ring 2 nearly equal with each other to suppress the heat value of the entire ball bearing.

Accordingly, it is possible to prevent seizing in a high speed rotation region without using a large flowrate lubrication system such as a jet lubrication or a preload method such as a constant pressure preloading thereby extending the life. Further, since it is no longer necessary to use the large flow rate lubrication system or the preload method such as the constant pressure preloading, it is possible to reduce the cost.

Further, it is preferred to form a metal deposition film comprising a relatively hard reaction product having a vicker's hardness of 1,000 Hv (kgf/mm$^2$) or more (hereinafter simply referred to as a hard deposition film) on the surface of the inner ring 2 and the outer ring 3, and the ball 4. For example, metal carbides or metal nitrides such as TiC, TiN, TiAlN, TiCN, CrN, $W_xC_y$ (each of x and y represents an integer), or composite products of the metal carbides and the metal nitrides can be used for the metal deposition film.

Then, for confirming the effect of the ball bearing 1 shown in FIG. 1, particularly, the result of measurement of the heat value in the entire ball bearing 1 obtained by an experiment conducted, for confirming the effect obtained by defining the outer ring groove radius ratio De and the inner ring groove radius ratio Di is to be described with reference to FIG. 2, the result of calculation for the product of the contact pressure with the ball 4 and the sliding speed (hereinafter referred to as PVD value) in the groove 8, 9 for each of the inner ring 2 and the outer ring 3 is to be described with reference to FIG. 3, and the result of measurement of the kinetic friction torque of the ball bearing 1 when at least one of the inner ring 2 and the outer ring 3 is rotated is to be described with reference to FIG. 4.

Figure 2:
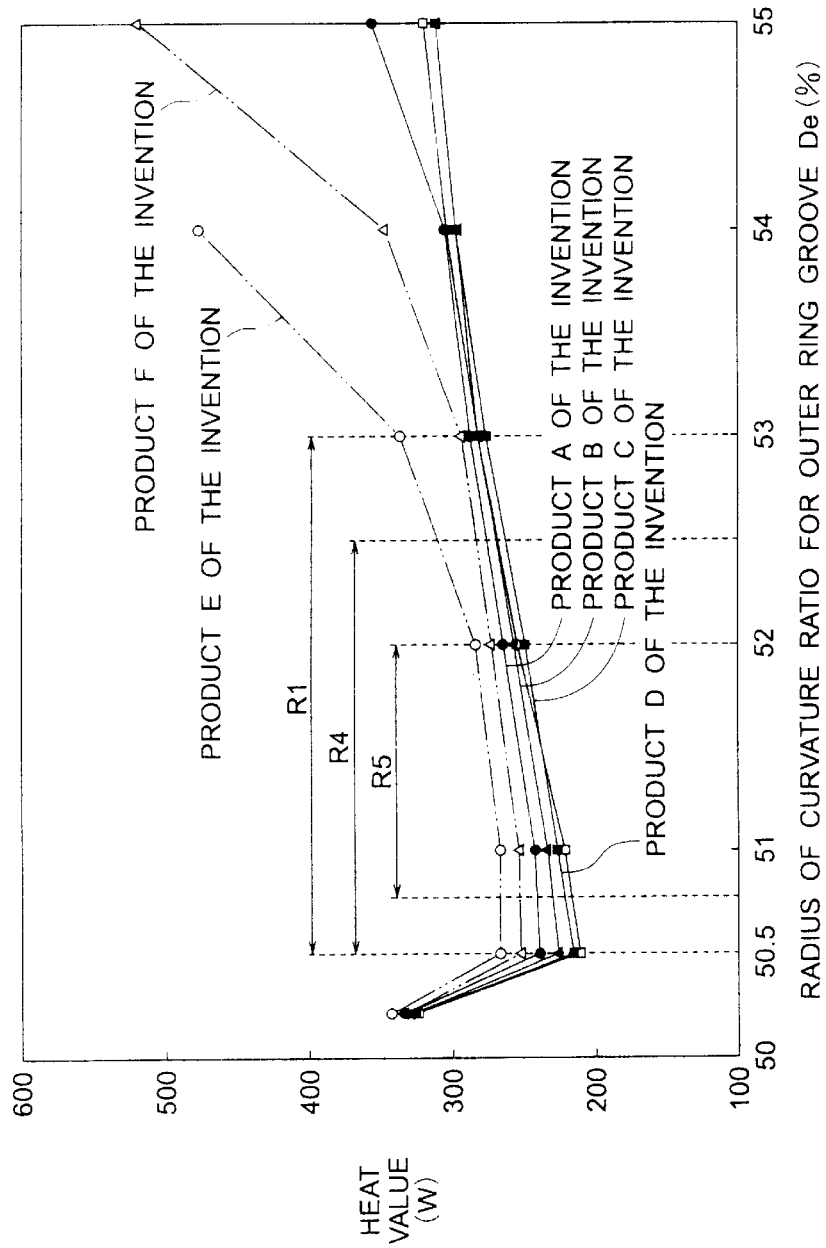
FIG. 2 is a graph showing the result of an experiment for measuring the heat value on the entire bearing for products according to the present invention.
Figure 3:
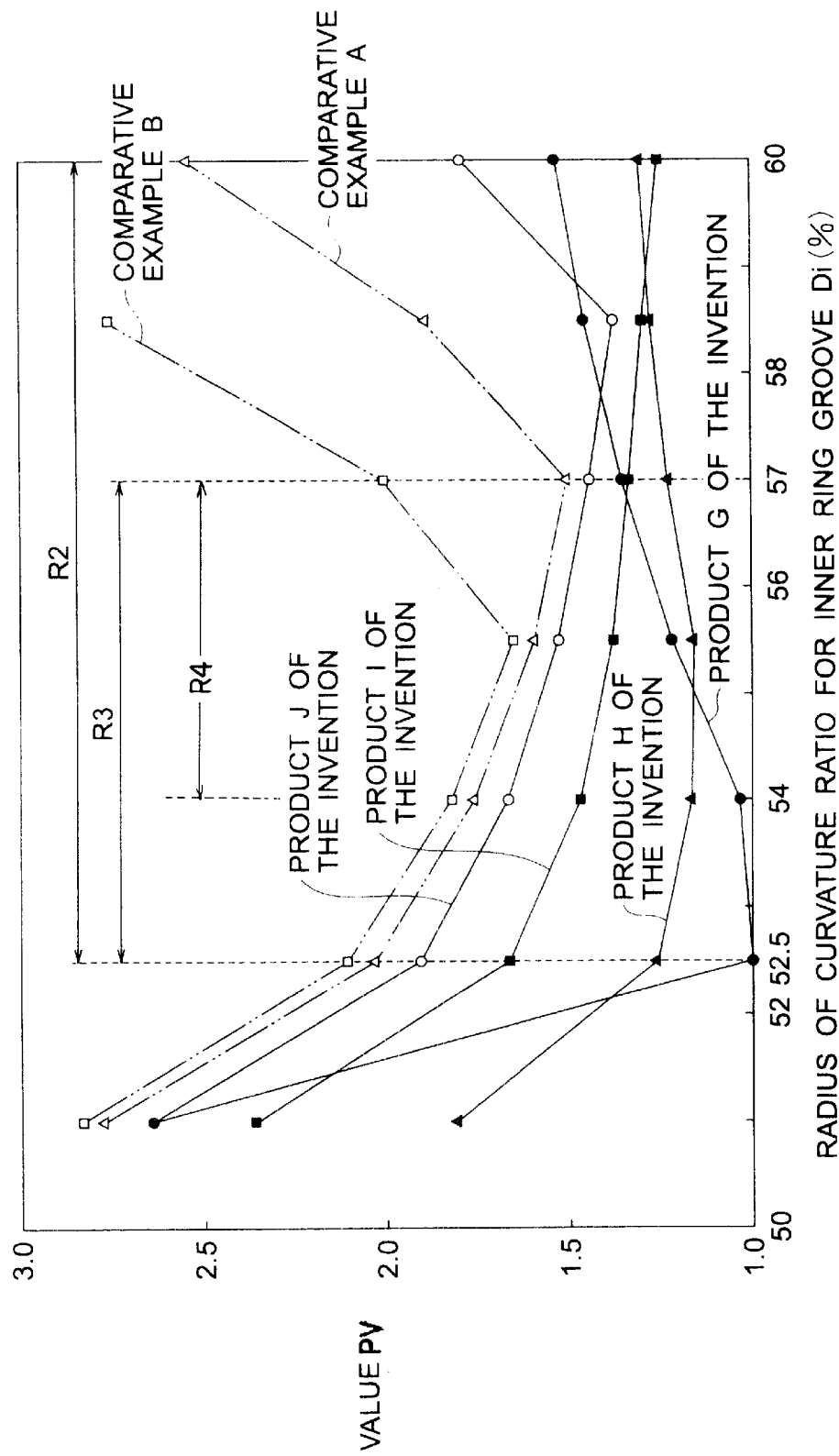
FIG. 3 is a graph showing the result of calculation for calculating the PV value for the entire bearing for products according to the present invention and comparative examples.

In the experiment and the calculation showing the result in FIG. 2 and FIG. 3, a ball bearing 1 comprising an inner ring 2 made of SUS 440C (martensitic stainless steel), an outer ring 3 made of SUJ2 (high carbon chromium bearing steel) and a ball 4 made of $Si_3N_4$ is used as a test specimen.

In the experiment showing the result thereof in FIG. 2, a plurality of ball bearings 1 with the radius of curvature for the groove 8 of the inner ring 2 and the radius of curvature for the groove 9 of the outer ring 3 are changed parametrically are provided and the amount of the heat generation in the entire ball bearing 1 was measured when the product value dn between the inner diameter d of the ball bearing 1 (inner diameter of the inner ring 2: mm) and the number of rotation n of the inner ring 2 (rpm) was at 2,100,000. Further, the axial rigidity along the direction of the axis P of the ball bearing 1 (elastic modulus) is assumed as 98 N/μm.

Further, also in the calculation the result of which is shown in FIG. 3, a greater PV value for the PV value between the inner ring 2 and the ball 4 and the PV value between the outer ring 3 and the ball 4 is described when the value dn was 2,100,000 and the radius of curvature for the groove 8 of the inner ring 2 and the radius of curvature for the groove 9 of the outer ring 3 are changed parametrically.

Each of the PV values shown in FIG. 3 is shown as a ratio assuming the PV value as 1 when the radius of curvature for the inner ring groove 8 is 52.5% of the diameter of the ball 4 and the radius of curvature for the outer ring groove 9 is 50.0% of the diameter of the ball 4.

FIG. 2 shows the result of actually measuring the heat value in the entire ball bearing 1 in a case where the ratio De between the radius of curvature for the outer ring groove and the ball diameter is 50.2%, 50.5%, 51%, 52%, 53%, 54% and 55% on the percentage basis for the test bearings, A, B, C, D, E and F of the products according to the present invention (shown in the drawing with solid circle, solid trigon, solid square, blank square, blank circle and blank trigon, respectively), and the inner ring groove radius ratio Di (inner ring groove radius/ball diameter) for each of the test bearings is formed as 57% (A), 55.5% (B), 54% (C), 52.5% (D), 60% (E) and 58.5% (F).

According to FIG. 2, each of the specimens shows a trend that the heat value increases abruptly when the radius of curvature for the outer ring groove 9 is decreased to less than 50.5% of the ball diameter da. This is because the contact area with the ball 4 in the outer ring groove 9 increases to increase the heat value as the radius of curvature for the outer ring groove 9 approaches 50% of the ball diameter da, for example, by the contact of the outer ring groove 9 at the entire surface of the ball 4. On the other hand, it has been found that the heat value may sometimes increase abruptly if the radius of curvature for the outer ring groove 9 is more than 53% of the ball diameter da.

Further, according to FIG. 2, it has been found that the product A, B, C, D, E and F according to the present invention in which the radius of curvature for the inner ring groove 8 is formed within a range of 52.5% or more and 60% or less of the ball diameter da can suppress the heat value within a range $R_1$ in which the radius of curvature for the outer ring groove 9 is 50.5% or more and 53% or less of the ball diameter da.

Further, according to FIG. 2, the products A, B, C and D according to the present invention in which the radius of curvature for the inner ring groove 8 is formed within a range from 52.5% or more and 57.0% or less of the ball diameter da can suppress the heat value more than that of the products E and f of the present invention.

FIG. 3 shows the result for the actual measurement of the PV value of the ball bearing 1 in a case where the value of ratio Di between the radius of curvature for the inner ring groove 9 and the ball diameter is 51%, 52.5%, 54%, 55%, 57%, 58.5% and 60% for the test bearings G, H, I and J according to the present invention together with those for comparative examples. The outer ring groove radius ratio De for each of the test bearings (outer ring groove radius/ball diameter) is formed to 50.5% (G), 51% (H), 52% (I) and 53% (J), respectively and in the PV values for the inner ring 2 and the outer ring 3 of the ball bearing 1, a greater PV value is shown (shown in the drawing by solid circle, black trigon, black square and blank circle, respectively).

In FIG. 3, in the ball bearing 1 of the Comparative Examples A, B shown by the dotted chain, the radius of curvature for the outer ring 9 is formed as 54% and 55% of the ball diameter da and in the PV values for the inner ring and the outer ring 3 of the ball bearings 1, a greater PV value is shown (shown by blank trigon and blank square). According to FIG. 3, as the radius of curvature for the inner ring groove 8 is smaller than 52.5% of the ball diameter, the PV value tends to increase abruptly in each of the cases. This is because the contact area with the ball 4 in the groove 8 increases as the radius of curvature decreases.

Further, the products G, H, I and J of the present invention in which the outer ring groove radius is formed as 50.5% or more and 53.0% or less of the ball diameter shows lower PV value corresponding to the heat value than that of Comparative Examples A and B in which the radius of curvature for the outer ring groove 9 is formed larger than 53% of the ball diameter da, within a range R2 in which the radius of curvature for the inner ring groove 8 is 52.5% or more and 60.0% or less of the ball diameter da.

Accordingly, it has been found that the heat value in the ball bearing 1 can be suppressed by forming the radius of curvature for the outer ring groove 9 as 50.5% or more and 53.0% or less of the ball diameter da, and forming the radius of curvature for the inner ring groove 8 within the range R2 of 52.5% or more and 60.0% or less of the ball diameter da.

Further, according to FIG. 3, the PV value is further lowered within a range R3 in which the radius of curvature for the inner ring groove 8 is 52.5% or more and 57.0% or less of the ball diameter da. Therefore, it has been found that the heat value in the ball bearing 1 can be suppressed further by forming the radius of curvature for the outer ring groove 9 as 50.5% or more and 53.0% or less of the ball diameter da and forming the radius of curvature for the inner ring groove 8 within the range R3 of 52.5% or more and 57.0% or less of the ball diameter da.

Further, according to FIG. 3, the PV value is further lowered within a range R4 in which the radius of curvature for the inner ring groove 8 is 54% or more and 57.0% or less of the ball diameter da.

Further, as the radius of curvature for the groove 8 or 9 is increased, the contact area with the ball 4 in each of the grooves 8 or 9 decreases to increase the contact pressure and possibly lower the life of the ball bearing 1. Accordingly, for taking the foregoings into a consideration, it is preferred to form a radius of curvature for the outer ring groove 9 within a range of 50.5% or more and 53.0% or less of the ball diameter da, and it is preferred that the radius of curvature of the inner ring 8 is formed within a range of 52.5% or more and 60.0% or less of the ball diameter da.

Further, according to FIG. 2, in order to suppress the amount of the heat generation in the entire ball bearing 1 it is preferred that the radius of curvature for the outer ring groove 9 is formed within a range R4 of 50.5% or more and 52.5% or less of the ball diameter da and, more preferably, within a range R5 of 50.75% or more and 52% less.

Figure 4:
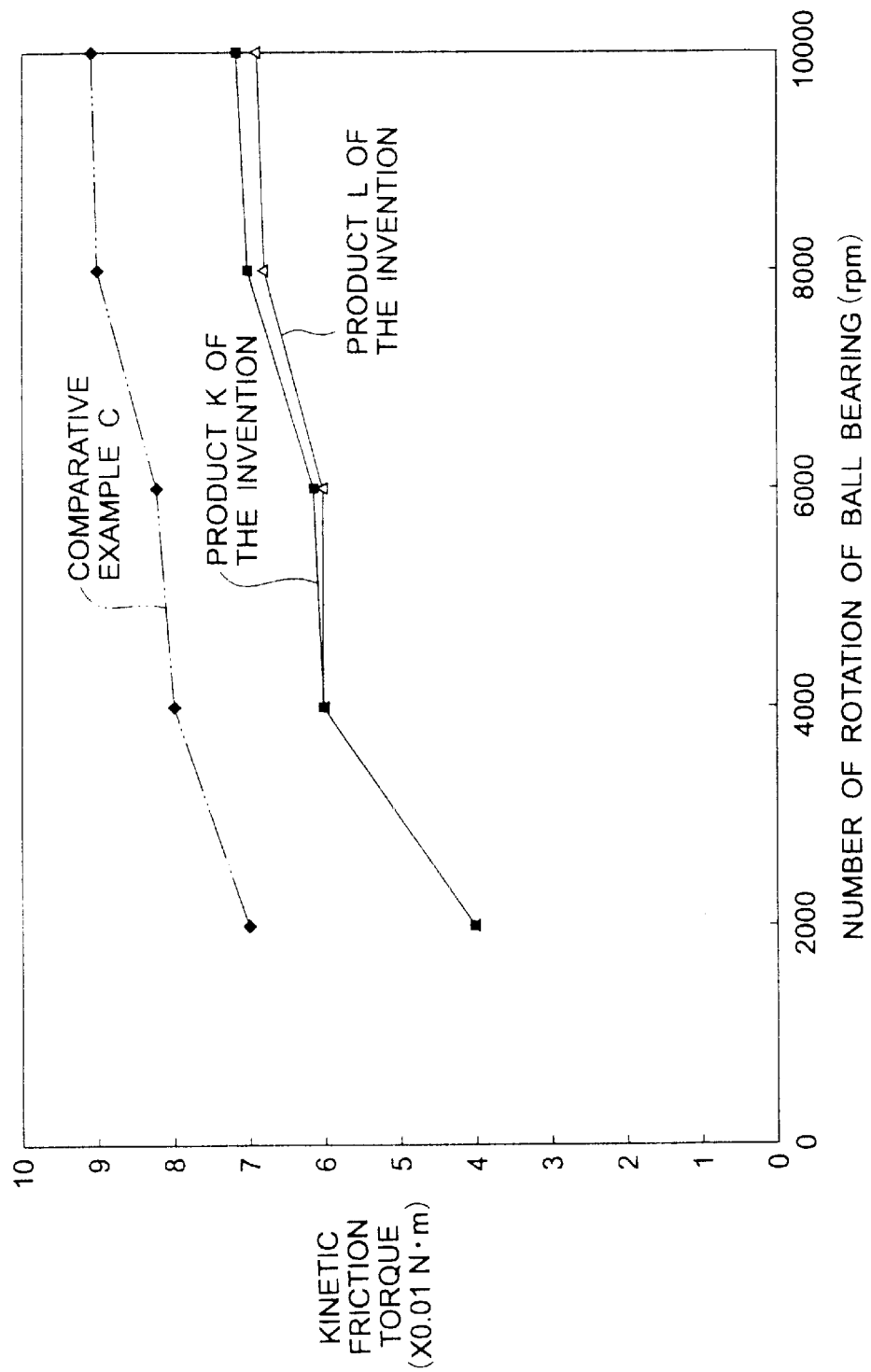
FIG. 4 is a graph showing the result of an experiment for measuring kinetic friction torque in the entire bearing for the product according to the present invention and comparative examples.

FIG. 4 shows the result of an experiment for measurement of kinetic friction torque of the ball bearing 1 for confirming that the amount of heat generation from the entire ball bearing 1 can be suppressed by constituting the ball 4 not only with ceramics but also with steels. The kinetic friction torque of the ball bearing 1 corresponds to the amount of heat generation from the entire ball bearing 1.

In this experiment, a plurality of ball bearings 1 comprising an inner ring 2 made of SUJ2 and having an inner diameter of 65 mm and an outer ring 3 made of SUJ2 and having an outer diameter of 100 mm were used as test specimens. Each of the inner ring 2 and the outer ring 3 is formed to the width of 18 mm.

In the experiment the result of which is shown in FIG. 4, a load at 200×9.8 N is exerted on each of the ball bearings 1 as the test specimens along the axial direction and oil-air lubrication is adopted using VG 32 oil as a lubricant as the lubrication method for the ball bearing 1. VG 32 oil is a lubricant defined, for example, in JIS (Japanese Industrial Standards) K2211. Further, in the experiment showing the result of which is shown in FIG. 4, the kinetic friction torque of the ball bearing 1 caused when one of the inner ring 2 and the outer ring 3 of the ball bearing 1 used as the test specimen was rotated.

The product K according to the present invention shown by the solid line in FIG. 4 shows the kinetic friction torque of the ball bearing 1 (indicated by solid square in the drawing) in which the radius of curvature for the outer ring groove 9 is formed as 52% of the ball diameter da, the radius of curvature for the inner ring groove 8 is formed as 56% for the ball diameter da, and the ball 4 is formed of steels.

The product L according to the present invention shown by the solid line in FIG. 4 shows the kinetic friction torque of the ball bearing 1 (shown by blank trigon in the drawing) in which the radius of curvature for the outer ring groove 9 is formed as 52% of the ball diameter da, the radius of curvature for the inner ring groove 8 is formed as 56% of the ball diameter da, and the ball is formed of ceramics.

Comparative Example C shown by the dotted chain in FIG. 4 shows the kinetic friction torque of the ball bearing 1 (shown by solid rhombus in the drawing) in which the radius of curvature for both of the inner ring groove 8 and the outer ring groove 9 is formed as 52% of the ball diameter da, and the ball 4 is formed of steels.

According to FIG. 4, in the product K and the product L according to the present invention, the kinetic friction torque is suppressed to less than that in Comparative Example C and it has been found from the result that the amount of heat generation from the entire ball bearing 1 can be suppressed by forming the radius of curvature for the inner ring groove 8 larger than 52% of the ball diameter da.

Further, according to FIG. 4, the kinetic friction torque of the product K according to the present invention in which the ball 4 is made of steels and the kinetic friction torque of the product L according to the present invention in which the ball 4 is made of ceramics are nearly equal with each other. Therefore, it has been found that the amount of heat generation from the entire ball bearing 1 can be suppressed also when the ball 4 is formed of steels not only of ceramics, by forming the radius of curvature for the inner ring groove 8 larger and forming the radius of curvature for the outer ring groove 9 smaller.

In the ball bearing 1 according to the present invention, the radius of curvature for the inner ring 8 is formed within a range of 52.5% or more and 60.0% or less of the ball diameter da, and the radius of curvature for the outer ring groove 9 is formed within a range of 50.5% or more and 53.0% or less of the ball diameter da. Therefore, since it is possible to decrease the heat value in the inner ring and make the heat value in the outer ring closer to the heat value in the inner ring and, after all, suppress the heat value in the entire ball bearing, the heat generation is lowered and seizing less occurs even when a large flowrate lubrication method such as jet lubrication or constant preloading is not used during high speed rotation. Further, since the use of large flow rate lubrication method or preloading method such as constant pressure preloading no more necessary, it is possible to reduce the cost. Further, the heat value can be suppressed further by constituting the ball 4 with ceramics of excellent heat resistance and wear resistance.

In the foregoing, the present invention has been described with respect to the ball bearing 1 but the invention is not restricted only thereto and is applicable to all kinds of existent ball bearings in which radius of curvature for the grooves both for the inner and the outer rings are designed as 52% of the ball diameter, such as axial contact ball bearing and, when the radius of curvature for the inner and the outer rings are combined within the range of the present invention, it is possible to provide a ball bearing at a reduced cost causing less heat generation and causing less seizing under high speed rotation.

Optimization for the ball diameter of the present invention is described below.

The ball diameter of the ball bearing gives an effect on the bearing life and the heat value. Usually, as one of means for compensating the lowering of the bearing life, it has been adopted a method of moderating the contact pressure by the increase of the number of balls, but this is restricted in view of the cage and increasing the number is also limited. Further, it has been known that even if the number of balls can be increased, this increases the number of contact points between the rolling element and the raceway surface to increase the heat generation sources and, as a result, it leads to increase in the temperature elevation of the bearing.

In view of the above, a relation between the ball diameter and the value for (outer diameter of outer ring—inner diameter of inner ring)/2 is previously determined by the following equation and the heat value (w) and $L_{10}$ life were measured and compared by using angular contact ball bearings of various sizes in which a hard deposition film was formed to 2 μm thickness on the raceway surfaces of the outer ring and the inner ring and an angular contact ball bearing of the same size with no hard coating as film test specimens.

2×ball diameter/(outer diameter of outer ring—inner diameter of inner ring)

conditions for each of the tested bearings are as follows.
Limiting rotational speed dmn value: 2,790,000.
Di=0.56
De=0.52

Figure 5:
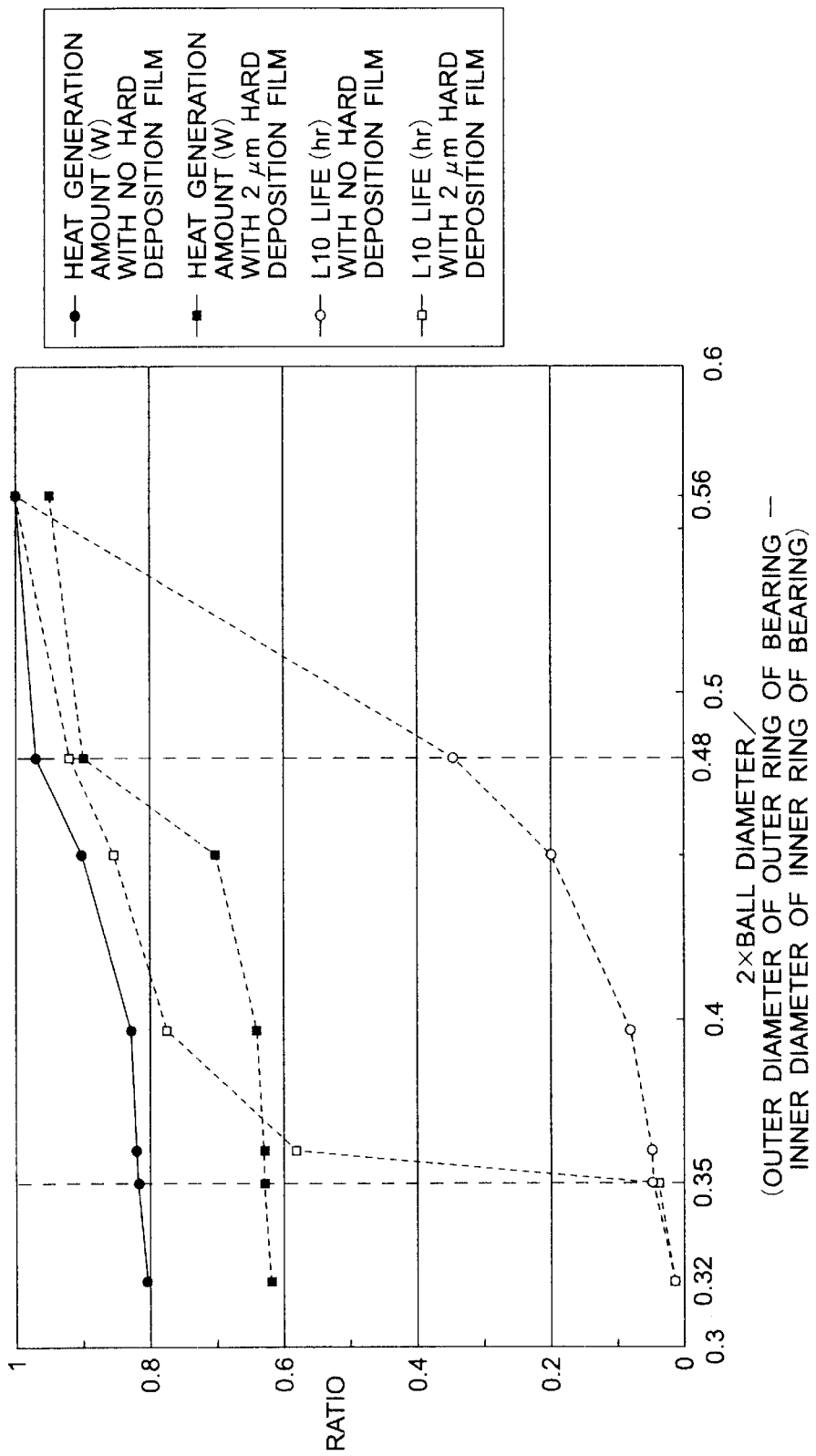
FIG. 5 is a graph showing a relation between the ball diameter and the heat value, and the bearing life in the product according to the present invention.

The result is shown in FIG. 5. The value for 2×ball diameter/(outer diameter of outer ring—inner diameter of inner ring) is indicated on the abscissa and the ratio with respect to each of the test specimens relative to 2×ball diameter/(outer diameter of outer ring—inner diameter of inner ring)=0.56 assumed as 1 is indicated on the ordinate.

Only with reference to the heat generation, the heat value increases remarkably if the ball diameter exceeds 0.48 times the value: (outer diameter of outer ring—inner diameter of inner ring)/2. Therefore, for restricting the heat generation, the ball diameter is preferably defined within a range from 0.32 to 0.48 times the value: (outer diameter of outer ring—inner diameter of inner ring/2. Further, for minimizing the life deterioration, it is preferably within a range from 0.35 to 0.45 times.

That is, when the value on the abscissa is from 0.32 to 0.48, either heat generation or life is favorable and the value from 0.35 to 0.45 is more preferred. It is further preferably from 0.36 to 0.46 and both of heat generation and life are preferable within this range. If it is less than 0.32, the ball diameter is reduced to decrease the slip and lower the heat value, whereas surface pressure (particularly with respect to the outer ring groove) increases and the hard deposition film tends to be peeled easily to shorten the life.

On the other hand, if it is in excess of 0.48, since the ball diameter is large, the surface pressure is lowered to extend the life, but the sliding increases to increase the heat value.

Referring to the life, application of the hard deposition film to the surface of at least one of the bearing rings of both of the inner and outer rings made of a metal material, or to at least the raceway surface is effective for the extension of the life. This is because increasing in the hardness of the raceway surface in this way can prevent occurrence of cracks or formation of indents.

As described above, it is apparent that seizing resistance and wear resistance under a high speed rotation of dmn value of 2,000,000 or more can be improved in which sliding or surface pressure at the contact point between the balls and the raceway surface of the ball bearing, by defining a plurality of conditions such as the size and the material of the ball and the hardness of the raceway surface of the inner and outer rings in contact therewith.

Figure 6:
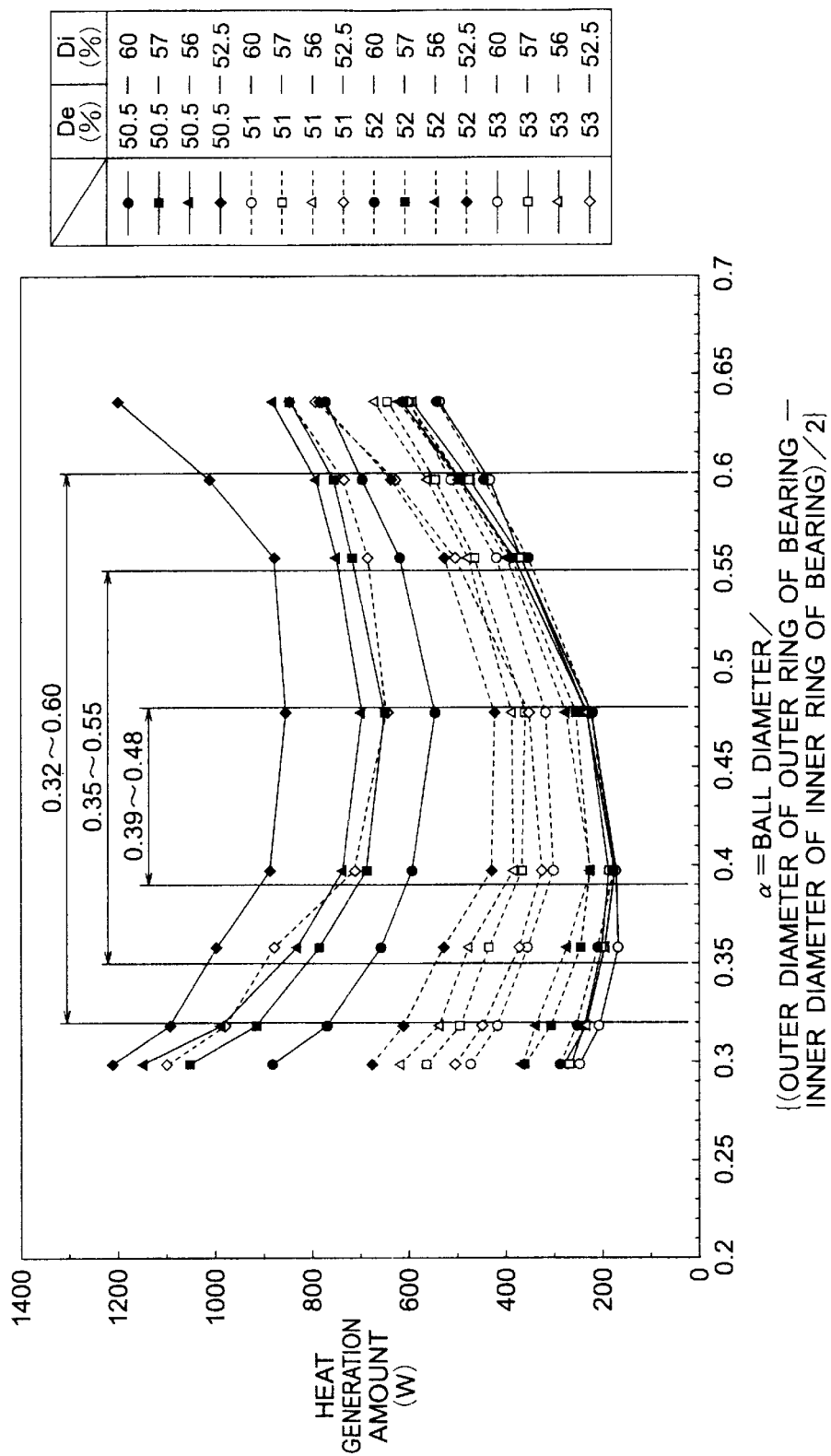
FIG. 6 is a graph showing a relation between the value α and the heat value measured for the ball bearings with different combinations for the groove diameter ratio of the outer ring and the inner ring.

FIG. 6 shows a result of a more detailed test conducted for further supporting the result of the test in FIG. 4.

That is, ball bearings each having an inner diameter for the bearing inner ring of 70 mm, an outer diameter for the bearing outer ring of 110 mm, a bearing width of 20 mm, having an initial axial rigidity of 980 N/μm at constant position preloading system under grease lubrication and at dmn value=2,100,000 are combined in a back-to-back manner (DB) to prepare a test specimen. Then, assuming the value for: ball diameter/{(outer diameter of outer ring—inner diameter of inner ring)/2} as α, in each of specimens the heat value (on ordinate) relative to various changes of the value a (abscissa) was measured and recorded. Decreasing of the value a means here that the ball diameter is decreased relative to the radial cross section of the bearing.

It can be seen from FIG. 6 that the heat value in the tested bearing can be kept lower within a range of the value α from 0.32 to 0.60, which is preferably within a range of the value α from 0.35 to 0.48 and, further preferably, within a range of the value a from 0.39 to 0.48. If the value α is less than 0.32, since the ball diameter is excessively small, the wall thickness of the cage has to be reduced and, as a result, this increases a collision force or a hoop stress exerted from the ball on the cage as the rotational speed goes higher and it is difficult to design the cage capable of withstanding them. Further, since the ball diameter is small, the contact area between the outer ring groove and the inner ring groove and the ball is excessively small to increase the contact pressure and also increase the heat value to result in oil film breakage, which deteriorates the life (refer to FIG. 5).

On the other hand, if the value α exceeds 0.60, the outer diameter is excessively large to make the centrifugal force on the ball excessive of a high speed rotation and, particularly, surface pressure increases between it and the outer ring groove, which not only deteriorates the life but also increases spin sliding at the contact point between the ball and the raceway groove, so that the heat value increases to reduce the bearing clearance and also increase the surface pressure, so the causes oil film is broken to result in seizing thus lowering the life.

Accordingly, in the ball bearing of the present invention, the maximum allowable range for the value α is defined as 0.32 to 0.60 (claim 2) and, further, a range from 0.35 to 0.48 (claim 3) and 0.39 to 0.48 for further lowering the heat value is defined as a preferred embodiment.

In FIG. 6, in a case of 50.5% to 52.5% as a combination of minimizing the value: (outer ring groove radius/ball diameter)×100 and the value: (inner ring groove radius/ball diameter)×100 in FIG. 6, although the surface pressure is lowered, the spin sliding increases to increase the heat value. The trend of increasing the heat value appears remarkably, particularly, in the case where the ratio for outer ring groove radius/ball diameter is small.

Optimization of number of balls of the present invention is described below.

The number of balls in the ball bearing also gives an effect on the bearing life and the heat value like that in the case of the ball diameter. As described previously, the contact pressure can be moderated by increasing the number of balls, but this is limited in view of the restriction of the cage. Further, since the number of contact points between the ball and the raceway surface increase to increases the heat generation sources, the heat value in the ball bearing increases. Accordingly, there is an optimum range for the number of balls. In the present invention, a value β regarding the number of balls represented by: pitch circle diameter×sin (180/number of balls)/ball diameter is assumed and β is defined within a range: $1.1 \leq \beta \leq 2.0$.

Figure 7:
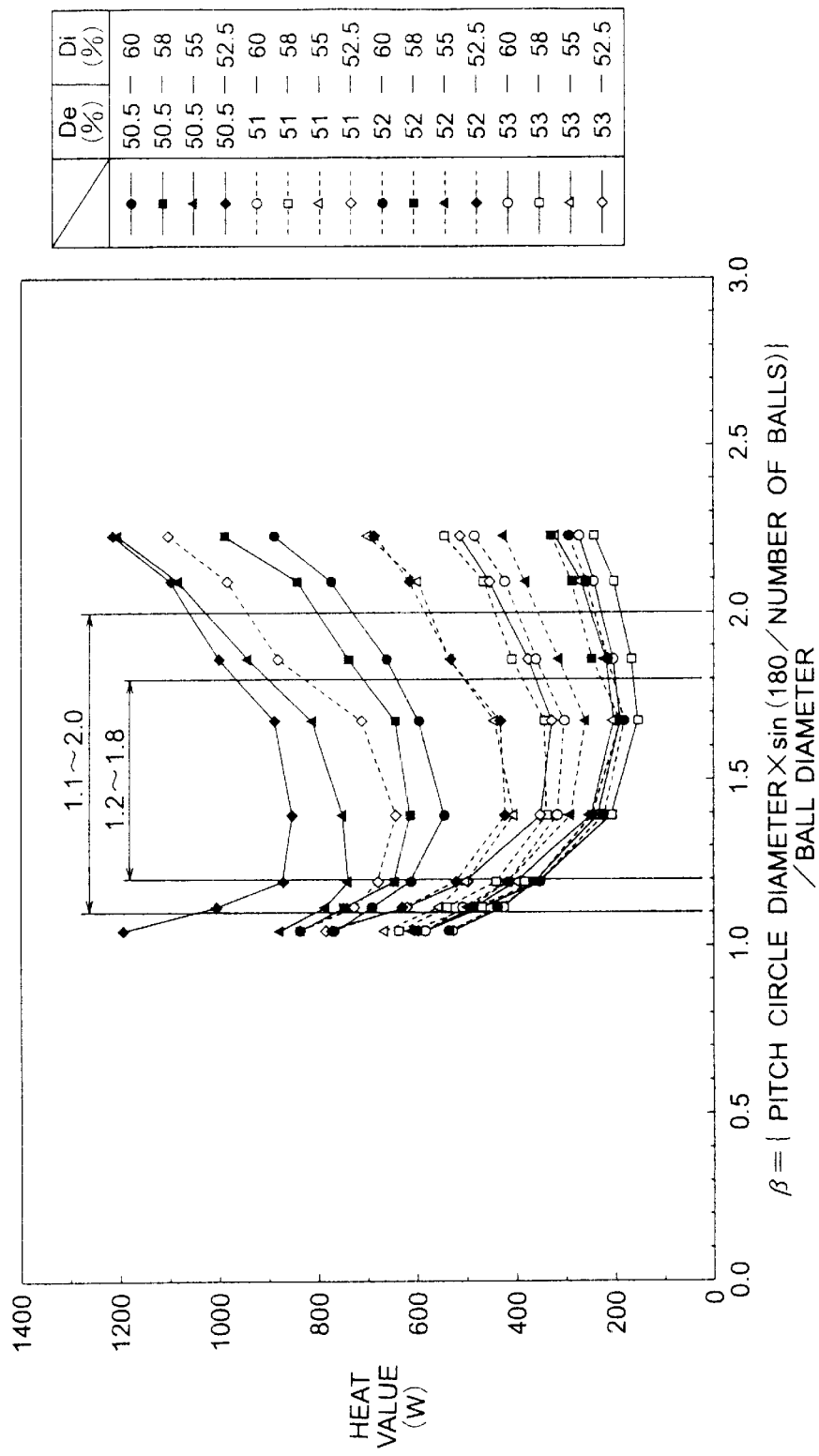
FIG. 7 is a graph showing a relation between the value β and the heat value measured for the ball bearings with different combinations for the groove diameter ratio of the outer ring and the inner ring.

FIG. 7 shows a relation between the value β (abscissa) and the heat value in the bearing (watt: ordinate) for the tested ball bearings of various combinations of (outer ring groove radius/ball diameter) ratio—(inner ring groove radius/ball diameter) ratios. Decreasing of the value β means that the ball space decreases on the pitch circle diameter of the bearing and means that the number of balls is increased in view of the design.

If the value β is less than 1.1, since the number of balls is large and the number of pockets in the cage has to be increased by so much, the circumferential width of the bar of the cage has to be narrowed and the bar of the cage is easily to be fractured by the impact as the number of rotation goes higher. Furthermore, increasing in the number of balls increases the stirring resistance of the lubricant in the bearing to increase the heat value. On the other hand, the value β in excess of 2.0 corresponds to excessive decrease of the number of balls in which the load exerting on the ball increases to increase the contact pressure with respect to the bearing ring to increase the spin sliding and, as a result, the heat value increases to cause oil film breakage or the like to deteriorate the life as has been described previously. In the present invention, the value β is defined within a range from 1.1 to 2.0. A range from 1.2 to 1.8 is a further preferred embodiment for the value β.

The material for the bearing ring of the present invention is described below.

As means for attaining less heat generation of the ball bearing under high speed rotation, while it has been described in view of the structural feature of the ball bearing, that is, optimization for the radius of curvature for the inner and outer ring raceway grooves, ball diameter and the number of balls, it has been found that optimization in view of the material for the bearing ring and the ball also provides an effective lowering of the heat generation in conjunction therewith.

As the metal material for the bearing ring of the ball bearing according to the present invention, materials forming secondary hardening precipitation type eutectic carbides, for example, high speed steels, semi-high speed steels, martensitic stainless steels are suitable and, for example, they include SKD, SKH, M 50 and SUS440C. Further, usual bearing steels (SUJ2) processed at an increased tempering temperature of 240° C. to 330° C. may be used as the metal material for the bearing ring, to which hard deposition film treatment may be applied. In this case, while the hardness of the matrix itself is lowered, the hardness on the surface of the bearing ring can be increased by the hard deposition film, so that a performance equivalent with that in the case of using the metal materials described above can be obtained.

Further, a material improved with the tempering resistance and dimensionally stabilized by the constituent element ingredients (material similar with high carbon chromium steels) is suitable. In this case, at least one of the inner ring and the outer ring is constituted with a steel material comprising from 0.2 to 1.2% of C, 0.7 to 1.5% of Si, 0.5 to 1.5% of Mo, 0.5 to 2.0% of Cr and the balance of Fe and inevitable impurity elements on the weight ratio, in which the surface carbon concentration is controlled to 0.8 to 1.3% and the surface nitride concentration is controlled to 0.2 to 0.8% by applying quenching/tempering treatment after carbonitridation.

The critical meanings for the effective range of each of the ingredient elements described above is to be described.

(1) Si: 0.7 to 1.5% by Weight

Si is an element having an effect of giving resistance to temper softening and it has an effect of improving the high temperature strength and retarding the decomposition of residual austenite which is effective for the prevention of indent-induced peeling under a high temperature circumstance. If the Si content is lower than 0.7% by weight, since the high temperature strength is insufficient and the indentin-duced peeling is caused, the lower limit value is defined as 0.7% by weight. On the other hand, if the Si content exceeds 1.5% by weight, since the mechanical strength is deteriorated and the carburizataion is hindered, the upper limit value is defined as 1.5% by weight.

(2) Mo: 0.5 to 1.5% by Weight

Mo is an element also having an effect of giving resistance to temper softening like that Si and it has an effect of improving the high temperature strength. Further, Mo functions as a carbide forming element for forming fine carbides on the carbonitrided surface. If the Mo content is less than 0.5% by weight, since the high temperature strength is insufficient and the carbides depositing on the surfaces is insufficient, the lower limit value is defined as 0.5% by weight. On the other hand, if the Mo content exceeds 1.5% by weight, since macro carbides are formed in the stage of the raw material, which results in dropping of the carbides to deteriorate the rolling contact fatigue life of the bearing, the upper limit value was defined as 1.5% by weight.

(3) Cr: 0.5 to 2.0% by Weight

Cr is an additive element showing the same function and effect as those of Mo. If the Cr content is less than 0.5% by weight, since the high temperature strength is insufficient and the amount of carbides depositing on the surface is insufficient, the lower limit value is defined as 0.5% by weight. On the other hand, if the Cr content exceeds 2.0% by weight, since macro carbides are formed in the stage of the raw material, which results in dropping of the carbides to deteriorate the rolling contact fatigue life of the bearing, the upper limit value was defined as 2.0% by weight.

(4) C: 0.2 to 1.2% by Weight

As described above, if the amount of the residual austenite increases excessively, the residual austenite is decomposed to cause aging change of the shape and deteriorate the dimensional stability of the bearing. On the other hand, presence of the residual austenite on the surface of the bearing ring is effective for the prevention of the indent-induced peeling. Accordingly, it is preferred to cause the residual austenite be present on the surface and, further, restrict the amount of the residual austenite in the entire bearing. For this purpose, the amount of the residual austenite in the core of the bearing has to be restricted. With the view point described above, it is preferred that the amount of the average residual austenite in the steels including the surface and the core is 5% by volume or less and, for this purpose, the carbon concentration on which the residual austenite depends has to be 1.2% by weight or less, the upper limit value is defined as 1.2% by weight. On the other hand, if the carbon concentration is below 0.2% by weight, since it takes a long time for obtaining a desired carburization depth in a carbonitridation to result in increase in the entire cost, the lower limit value is defined as 0.2% by weight.

(5) Surface C Concentration: 0.8 to 1.3% by Weight

When carbon is added to the surface by carbonitridation, the martensitic structure as a matrix can be put to solid solution hardening, and a great amount of residual austenite effective to the prevention of the indentation-induced peeling can be formed at the outermost surface layer. If the surface carbon concentration is below 0.8% by weight, since the surface hardness is insufficient to deteriorate the rolling contact fatigue life and the wear resistance, the lower limit value is defined as 0.8% by weight. On the other hand, if the surface carbon concentration exceeds 1.3% by weight, since macro carbides are deposited upon carbonitradation to lower the rolling contact fatigue life, the upper limit value is defined as 1.3% by weight.

(6) Surface N Concentration: 0.2 to 0.8% by Weight

When nitrogen is added to the surface by carbonitridation, the tempering resistance is improved to increase the high temperature strength and improve the wear resistance, as well as a great amount of residual austenite effective to the prevention of indent—induced peeling can be caused to be present on the outermost surface. If the surface nitrogen concentration is below 0.2% by weight, since the high temperature strength is lowered to deteriorate the wear resistance, the lower limit value is defined as 0.2% by weight. On the other hand, if the surface nitrogen concentration exceeds 0.8% by weight, since grinding finish upon manufacture of bearings is difficult and productivity of the bearing is lowered due to the difficulty in the grinding, the upper limit value is defined as 0.8% by weight.

(7) Other Ingredient Elements

A small amount of Ti as the other ingredient element is preferably added. This is because fine titanium carbides (TiC) or carbonitrides (Ti(C+N)) are deposited and dispersed in the matrix by the addition of Ti to improve the wear resistance and the seizing resistance. In this case, the Ti content is preferably from 0.1 to 0.3% by weight. If the Ti content is below 0.1% by weight, since no deposition effects of the carbides can be obtained, the lower limit value is defined as 0.1% by weight. On the other hand, if the Ti content exceeds 0.3% by weight, since macro depositions tend to be formed, which form defects to rather lower the rolling contact fatigue life, the upper limit value is defined as 0.3% by weight. By the way, if the size of the titanium depositions (TiC, Ti(C+N)) is 0.1 $\mu$m or less, it contributes to the improvement of the wear resistance and the seizing resistance.

It is desirable that inevitable impurity elements such as S, P, H and O are not contained as less as possible. Particularly, if the content of oxygen (O) exceeds 12 ppm, since oxide series inclusions tend to be formed, which act as defects to sometimes deteriorate the rolling contact fatigue life, the oxygen content is desirably less than 12 ppm.

Now, preferred examples are described together with comparative examples.

EXAMPLE

An angular contact ball bearing 1 shown in FIG. 1 was used as the test specimen. The radius of curvature for the inner ring groove 8 is 55% of the ball diameter da and the radius of curvature for the outer ring groove 9 is 52% of the ball diameter da. Further, referring to each size, the inner diameter is 65 mm, the outer diameter is 100 mm, the width is 18 mm and the ball pitch circle diameter is about 82.5 mm. The inner ring 2 and the outer ring 3 use a material shown as steel A in FIG. 8 containing 0.94% by weight of C, 1.02% by weight of Si, 0.88% by weight of Mo and 1.52% by weight of Cr as the alloying elements and subjected to carbonitridation to provide the surface carbon concentration of 1.15% and the surface nitrogen concentration of 0.23%. The ball 4 is of a true spherical shape made of silicon nitride ceramics and the cage 10 is made of a heat resistant resin.

COMPARATIVE EXAMPLE

The angular contact ball bearing 1 also shown in FIG. 1 is used as a test specimen. In the ball bearings of Comparative Example 1 and Comparative Example 2, the radius of curvature for the inner ring groove 8 is 52% of the ball diameter da, while the radius of curvature for the outer ring groove 9 is 52% of the ball diameter da. In the ball bearing of Comparative Example 3, the radius of curvature for the inner ring groove 8 is 55% of the ball diameter da, while the radius of curvature for the outer ring groove 9 is 52% of the ball diameter da. Steel materials of the composition shown as steel B in FIG. 8 (SUJ2) was used for the ball bearings of Comparative Example 1 and Comparative Example 3. The steel A of the identical composition as that in Example 1 was used for the bearing of Comparative Examples 2.

The ball 4 and the cage 10 used were identical with those in Example 1.

EVALUATION TEST

Figures 8, 9:
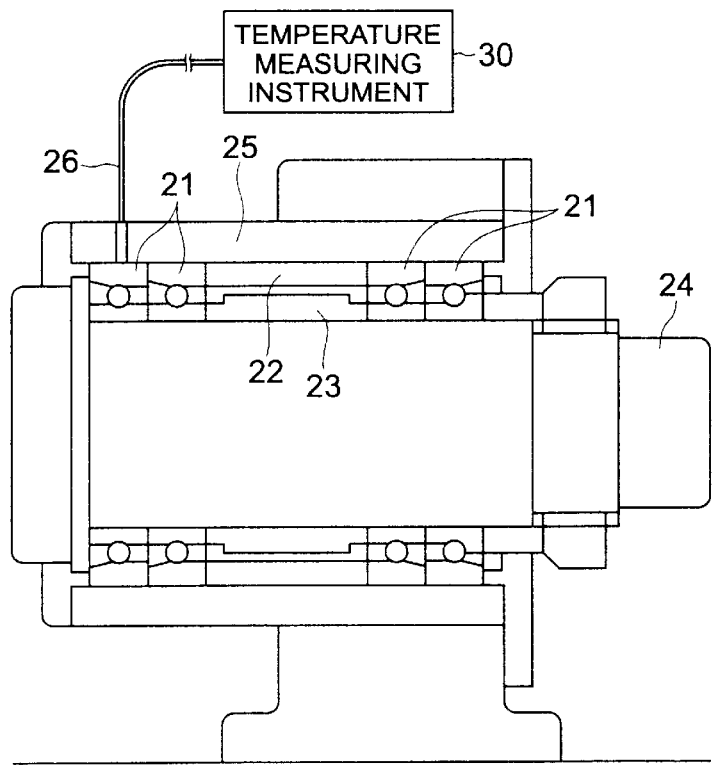
FIG. 8 is a table showing ingredient compositions of steel specimens used for tested ball bearings.
FIG. 9 is a schematic constitutional view showing an evaluation test apparatus.

For evaluation of heat generation of bearings under high speed rotation, a test machine simulating a machine tool main spindle shown in FIG. 9 was manufactured and an evaluation test was conducted. Test bearings 21—21 were arranged as back-to-back 4 row combination by way of a spacers 22, 23 and assembled to a shaft 24 and a housing 25. ISOFLEX NBU15 of KRYUBA was used for the bearing lubrication. Preloading for the bearing (axial clearance) was controlled on every test by using spacers or the like such that the axial rigidity was 98 N/$\mu$m, so that the difference of the prepressure had no effect on the temperature elevation. Rotation was applied by a motor (not shown) from the axial end and the temperature elevation in the bearing outer ring was measured by using thermocouple 26 connected to a temperature measuring instrument 30.

Then, the result of evaluation is to be described with reference to FIG. 10 and FIG. 11.

Figure 10:
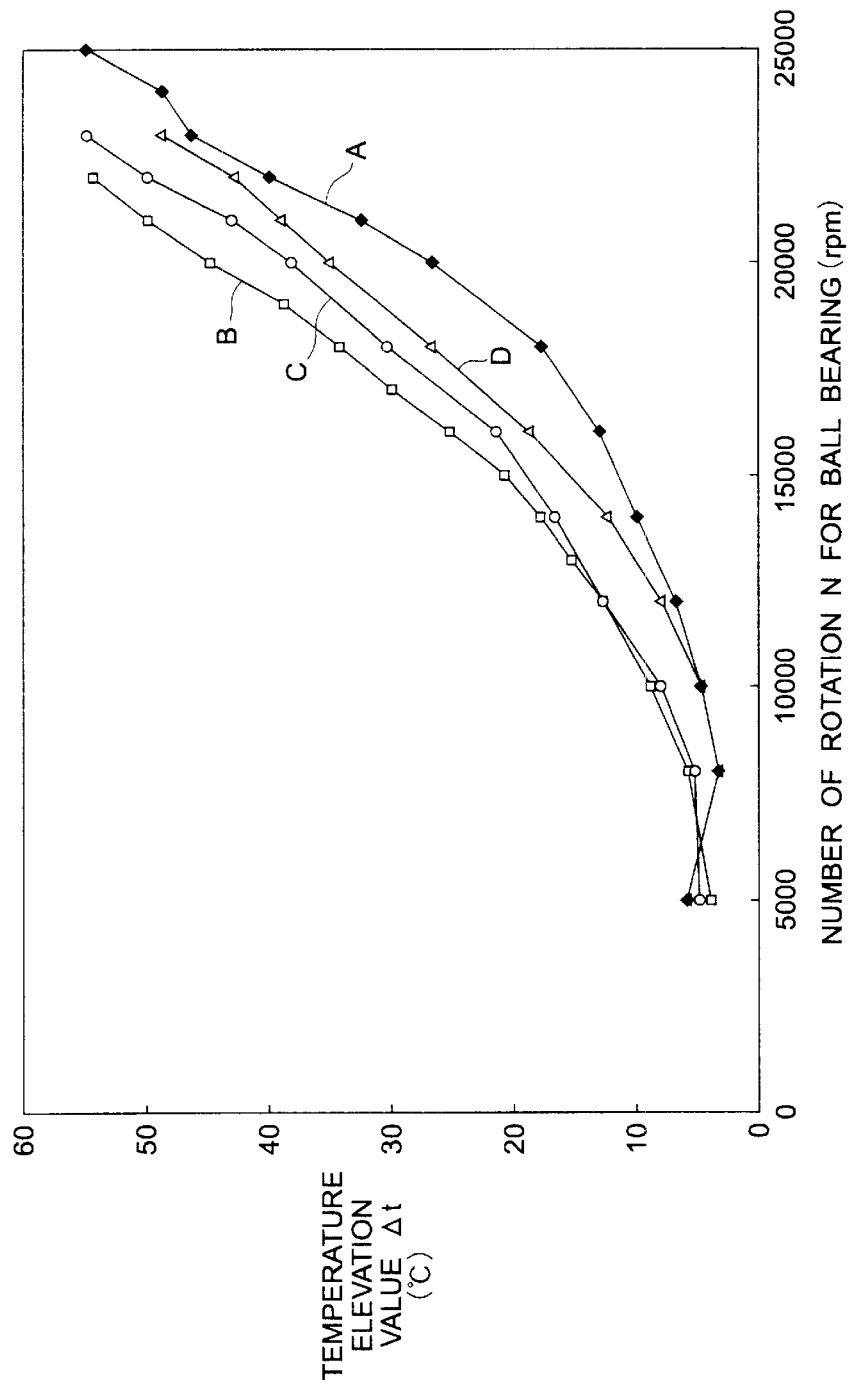
FIG. 10 is a characteristic diagram showing the result of the evaluation test.

In FIG. 10, number of rotation N (rpm) was indicted on the abscissa and the temperature elevation Δt (° C.) for the outer ring of the bearing was indicated on the ordinate and the result of examination for correlationship between both of them in various type of bearings is shown. In the drawing, the curve A shows the result for the ball bearing comprising the steel A (Example 1) of the composition shown in FIG. 8, the curve B shows the result for the ball bearing comprising the steel B (Comparative Example 1), the curve C shows the result of the ball bearing comprising the steel A (Comparative Example 2), the curve D shows the result of the ball bearing comprising the steel B (Comparative Example 3), respectively. As apparent from FIG. 10, it was confirmed from the result for Example 1 (curve A) that the temperature elevation value in the outer ring of the bearing is lower compared with the result of Comparative Examples 1, 2 and 3 (curves B, C and D).

Figures 11, 12:
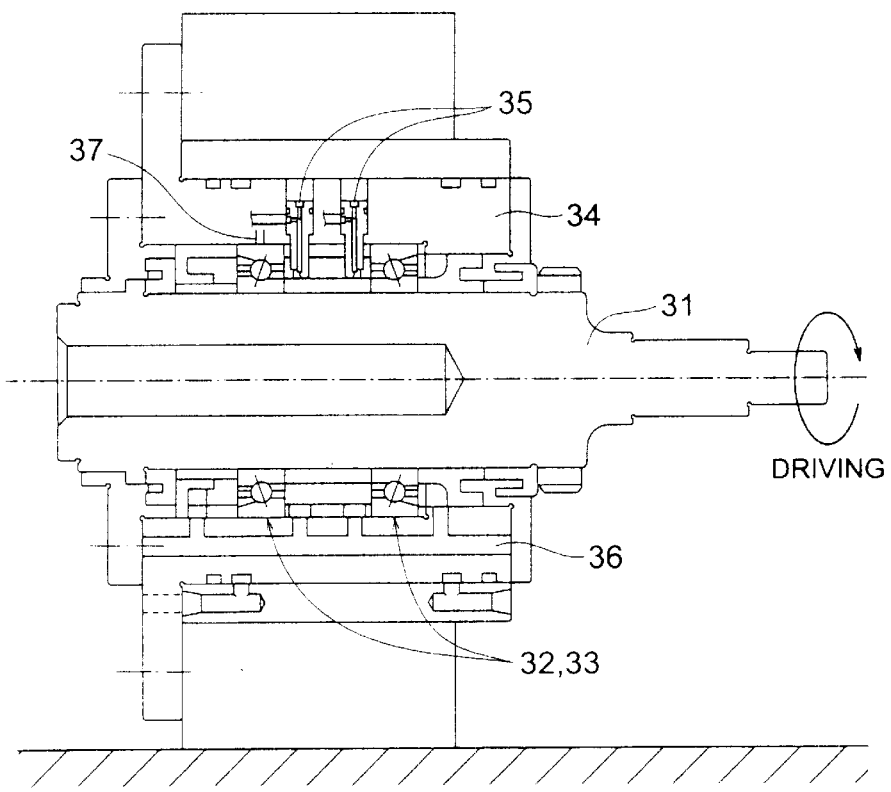
FIG. 11 is a performance evaluation table for each of bearing showing the result of the evaluation test.
FIG. 12 is a cross sectional view showing the structure of a ball bearing tester.

For example, when the value of temperature elevation are compared for each of the bearings under at high speed rotation, the number of rotation of 20,000 rpm, a difference is produced for the temperature elevation value Δt depending on the difference of the material between the inner and the outer rings even between the bearings having the identical radius of curvature for the inner and outer ring grooves (Example 1 and Comparative Example 3; and Comparative Examples 2 and 3) as shown in FIG. 11. That is, while the temperature elevation value Δt for the outer ring is 35° C. in the bearing of Comparative Example 3, the temperature elevation value Δt for the outer ring of the bearing in Example 1 is restricted as low as 27° C. This is 78% as the suppressing effect for the temperature elevation value. Further, while the temperature elevation value Δt for the outer ring is 45° C. in the bearing of Comparative Example 1, the temperature elevation value Δt is restricted as low as 38° C. in the bearing of Comparative Example 2. This is 84% as the suppressing effect for the temperature elevation value. Such a suppressing effect for the temperature elevation value shows the effect of lowering friction in a high speed region of the material according to the present invention.

Further, even between the bearings made of the identical material (Example 1 and Comparative Example 2; Comparative Examples 1 and 3), a difference is produced for the temperature elevation value Δt depending on the difference of the curvature for the inner and outer ring grooves. That is, while the temperature elevation value Δt for the outer ring is 38° C. in the bearing of Comparative Example 2, the temperature elevation value Δt for the outer ring is restricted as low as 27° C. in the bearing of Example 1. This is 71% as the effect of restricting the temperature elevation value. Further, while the temperature elevation value Δt for the outer ring is 45° C. in the bearing of Comparative Example 1, the temperature elevation value Δt for the outer ring is 35° C. in the bearing of Comparative Example 3. This is 78% as the effect of restricting the temperature elevation value.

While the example has been described compared with Comparative Examples based on the evaluation data, it can be expected that the bearing material in which TiC is deposited on the surface by further adding Ti as the alloying element also has an effect of lowering the temperature elevation value Δt.

Further, as an excellent effect of the present invention, improvement for the grease life is mentioned. Actually, when the bearing rotates at a high speed, the grease life time is shortened to lower than the desired life time for the machine. However, since the grease life undergoes a significant effect by the working temperature, a long grease life can be attained even during high speed in the bearing according to the present invention with less heat generation.

As described above according to the present invention, it is possible to provide a bearing that causes less temperature elevation and suffers from less seizing during high speed rotation and having long life and a bearing device or a spindle with a high reliability can be attained.

Further preferred other examples are to be described below.

In this test, a ball bearing having inner and outer rings of heat resistant specification (hereinafter referred to SHX bearing) and a ball bearing having the same extent of the surface hardness by applying water hardening to existent inner and outer rings made of SUJ2 are assembled in a testing machine to determine the relation between the outer ring temperature and the number of rotation.

EXAMPLE

An angular contact ball bearing shown in FIG. 1 was used as a test specimen in which the radius of curvature for the inner ring groove 8 was 56% of the ball diameter da and the radius of curvature for the outer ring groove 9 was 52% of the ball diameter da. Each of the size, such as inner diameter, outer diameter, width or ball pitch circle is identical with that in the example described above.

However, as the material for the inner ring 2 and the outer ring 3, an alloy composition considered most desirable within the range of the material composition of the present invention comprising 0.4% by weight of C, 1.0% by weight of Si, 1.0% by weight of Mo and 1.5% by weight of Cr was selected. It was subjected to each of the treatments of carbonitridation, hardening (869° C.) and tempering (at 300° C.) successively to provide the surface hardness HV 760. The surface carbon concentration was 0.95% and the surface nitrogen concentration was 0.25%.

The ball 4 was made of silicon nitride ceramics ($Si_3N_4$).

COMPARATIVE EXAMPLE

The angular contact ball bearing 1 shown in FIG. 1 was also used as the test specimen and SUJ2 was used for the material of the inner and outer rings and was hardened to a surface hardness HV 760. The ball 4 was made of $Si_3N_4$. The size was identical with that in the example described above.

EVALUATION TEST

As evaluation for heat generation of bearings under high speed rotation, an evaluation test was conducted by using a testing machine shown in FIG. 12 simulating a main spindle of machine tool. The main spindle 31 is in a spindle structure supported on two ball bearings 32, 33 arranged in a back-to-back combination (tested bearing) and rotated by way of a motor gear not illustrated. A through hole for radially feeding a lubricant is formed in a substantially center of a testing machine main body 34 in the axial direction, and at an intermediate position between the two tested bearings to which an oil air nozzle 35 is inserted. The oil air nozzle 35 has a structure capable of being replaced with a grease nipple. Further, an exhaust channel 36 is disposed for exhausting air in a space of installing the ball bearings 32, 33. Further, thermocouple 37 is disposed so as to measure the temperature elevation for the outer ring of the bearing. The preloading of the bearing (axial clearance) is controlled constant by a spacer or the like such that the difference of the preloading has no effect on the temperature elevation. Temperature was measured by the thermocouple 37 as the saturation temperature after lapse of a predetermined time of one hour or more.

Figure 13:
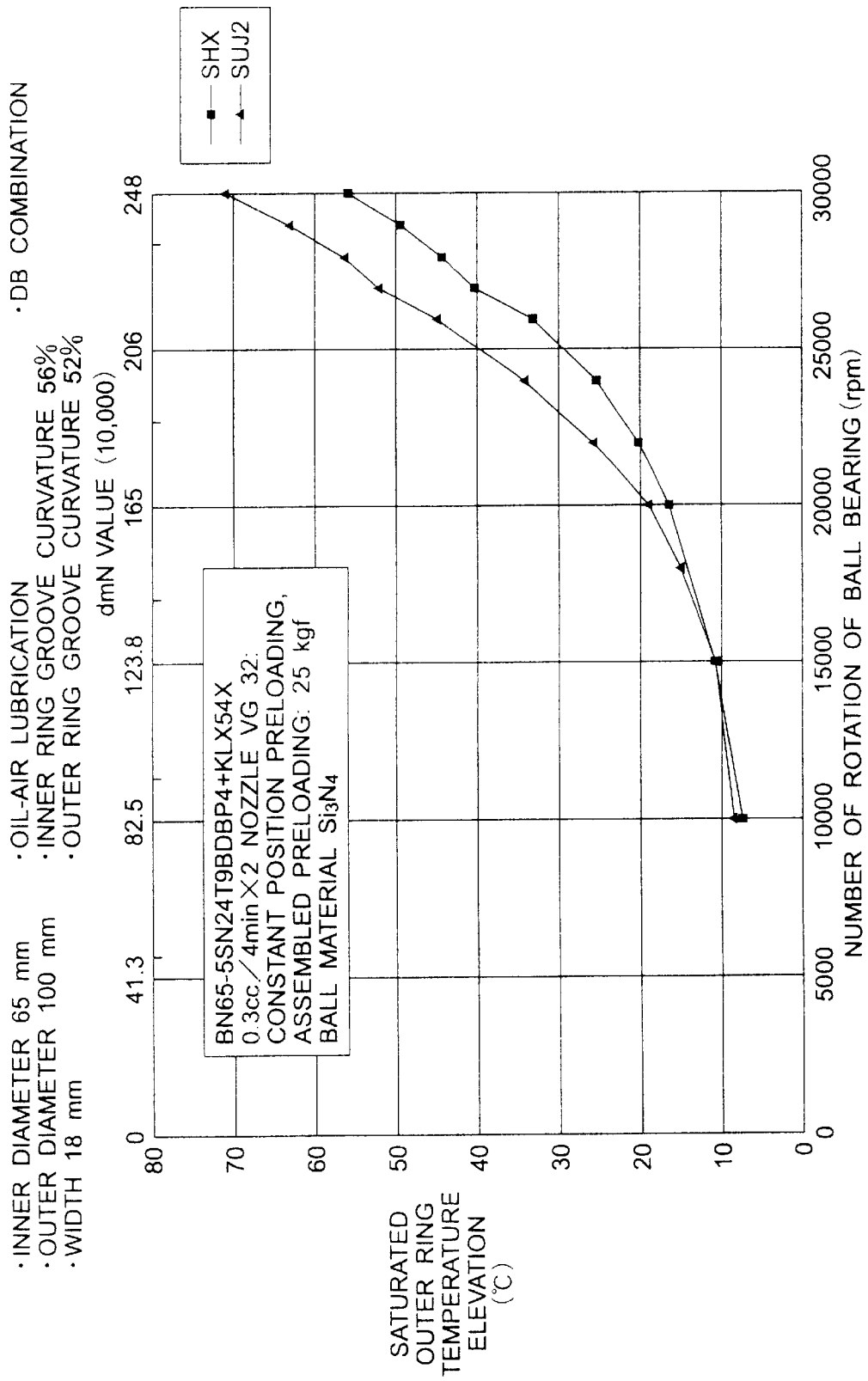
FIG. 13 is a graph showing a relation between the ball bearing material, the number of rotation of the bearing and the saturated value for the temperature elevation in the outer ring.

The result of the evaluation test is to be described with reference to FIG. 13. The scale on the abscissa in FIG. 13 represents the number of rotation (rpm) and the indicated number of rotation is denoted by dmn value as below. 10000 rpm for 825,000 dmn, 15,000 rmp for 1,238,000 dmn, 20,000 rpm for 1,650,000 dmn, 25,000 rmp for 2,060,000 dmn and 30,000 rmp for 2,480,000 dmn.

The SHX bearing according to the present invention having high tempering resistance by carbonitridation has a small friction coefficient with balls. While the saturated outer ring temperature has no difference with that for the bearing of comparative examples at a number of rotation of 15,000 rmp (1,238,000 dmn), the temperature difference gradually increases as the number of rotation increases. It is apparent from this that the SHX bearing according to the present invention can maintained the oil film of the lubricant under the working condition of 2,000,000 dmn or more and has long life.

Then, coating for the bearing ring of the present invention is described below.

Figure 14:
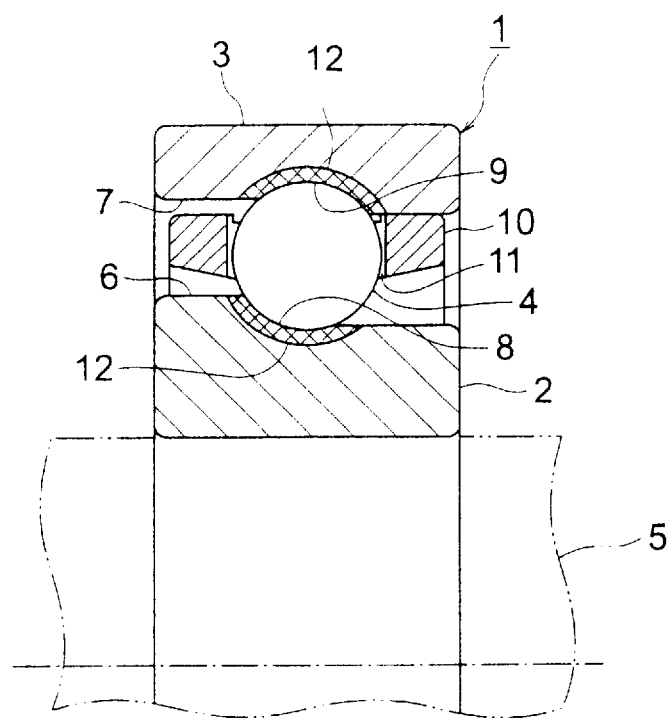
FIG. 14 is a cross sectional view for a portion, in an large scale, of a bearing according to the present invention applied with a hard deposition film.

As an effective means for providing the performance of less heat generation and less temperature elevation for the ball bearing even under high speed rotation can include formation of hard deposition film to the raceway surface of bearing rings. For example, the entire raceway surface for the inner ring raceway groove 8 and the outer ring raceway groove 9 of the ball bearing 1 shown in FIG. 14 is covered with a hard deposition film 12. However, the hard deposition film 12 is not restricted only to the inner ring raceway surface 8 and the outer ring raceway surface 9 as shown in the drawing. It may be optionally formed on the entire surface of the outer diametrical surface 6 of the inner ring 2 and the entire surface of the inner diametrical surface of the outer ring 3 (that is, on the raceway surface 7 and the both shoulder surface as the guide face of the cage 10). Further, it may be formed so as to be coat the entire surface of the inner ring 2 and the enter surface of the outer ring 3.

In any cases described above, the hard deposition film 12 is not always formed on both bearing rings of the inner ring 2 and the outer ring 3 but it may be formed only to one of the bearing rings.

Details for the type, thickness, film forming method of the hard deposition film 12, as well as the metal material for the inner and outer rings to be applied with the coating and substrate treatment thereof will be described.

As the hard deposition film in the present invention, those having vicker's hardness of Hv 1000 or more are preferred and they can include, for example, metal carbides and metal nitrides such as TiC, TiN, TiCN, TiAlN, CrN, $W_xC_y$ (both x and y are integers) or composite products thereof. The reason why such hard deposition film is effective is that it has a surface hardness nearly equal with or more than that of the ceramics such as silicon nitride used for rolling elements and has excellent wear resistance than the metal for the bearing ring.

Under the working conditions where obstacles intrude into the bearing, deposition film such as of TiN, TiC or TiCN, TiAlN has longer coating life. On the other hand, if slidability is required, CrN or $W_xC_y$ is relatively desirable. There is no particular restriction on the crystal form or orientation face of reaction products deposited by film forming reaction and CrN coating is preferred having relatively less columnar crystals referring, for example, to the example of crystal forms. Further, with respect to the orientation face, reaction products having (110, 220) face easy to slip by shearing are preferred among others.

The thickness of the hard deposition film is desirably from 0.05 to 8 $\mu$m and, preferably, from 0.1 to 5 $\mu$m and, further preferably, from 0.5 to 3 $\mu$m. If the layer thickness is less than 0.05 $\mu$m, the surface of the substrate metal is exposed greatly to reduce the performance of the hard deposition film and, as a result, the effect of improving the slidability and the wear resistance is decreased. On the other hand, if the thickness is more than 8 $\mu$m, the inner stress of the reaction products is increased to deteriorate adhesion with the substrate metal to cause easy peeling.

As the film forming method, physical vapor deposition (PVD) such as ion plating or sputtering, or chemical vapor deposition (CVD) as one of gas phase coating methods is desirable. Among them, preferred are arc discharge type high vacuum ion plating capable of increasing the ionization rate of film forming elements or plasma PVD of reacting gaseous molecules in non-equilibrium state such as reactive magnetron sputtering in which a metal target and a reaction gas are present together.

The ionization rate is increased because this has a merit not suffering from restriction for the processing materials since the film can be formed at a low reaction temperature in which film can be formed at a lower reaction temperature in the reactive sputtering since plasmas are utilized. Further, the plasma CVD also has a merit of not suffering from the restriction for the processing material since the deposition temperature is lowered to ⅓–¼ compared with usual CVD.

As the substrate treatment for forming the hard deposition film, gas nitridation, ion nitridation or ion injection is suitable among nitridation and the nitrogen content is preferably controlled properly. For instance, the thickness of the nitride layers as the diffusion layer is preferably from 0.1 to 60 $\mu$m and, further, 0.1 to 0.8% is preferred for the nitrogen concentration. If it is less than 0.1%, the surface layer lacks in the slidability and, on the other hand, if it is more than 0.8%, adhesion between the reaction deposition and the substrate material is deteriorated because of high nitrogen concentration at the surface.

Then, the effect of angular contact ball bearings applied with the hard deposition film according to the present invention is to be described referring to examples.

EXAMPLE

The relation (dependence on film thickness) between the thickness of the hard deposition film and the seizing resistance in the present invention was evaluated.

In the evaluation, a ball-on-disk type toribometer according to a TIMKEN type testing instrument was used. As test specimens, disks with 100 mm outer diameter made of M50 material having WC/C film formed on the surface by using an arc discharge type ion plating apparatus were used. The film thickness was changed by controlling the reaction time and fluorescent X-rays were used for the measurement of the film thickness.

A ball with 12.7 mm in diameter made of $Si_3N_4$ was brought into contact with the surface of the rotary disk having various film thickness under a load of 294 N and a motor load (motor overcurrent value) was measured while rotating the disk at a speed of 5,001 rpm under oil lubrication. When a predetermined motor load was applied by seizing, the rotation was stopped and the seizing resistance time was defined with the duration period of rotation.

Figure 15:
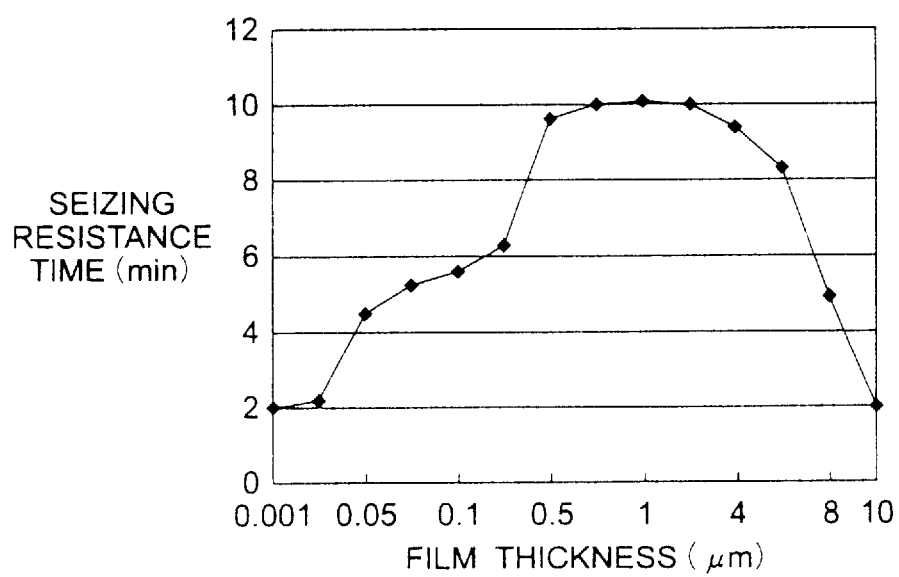
FIG. 15 is a showing relation between the thickness and the seizing resistance of the hard deposition film shown in FIG. 14.

The result is shown in FIG. 15. From the result, it can be said that the film thickness of the reaction product is desirably within a range from 0.05 to 8 μm and, preferably, within a range from 0.1 to 5 μm.

EXAMPLE

The relation between the substrate treatment and the seizing resistance in the angular contact ball bearings of the present invention was evaluated. In the evaluation, a ball-on-ring type testing instrument according to TIMKEN type testing instrument was used. As test specimens, rings with 60 mm outer diameter made of M50 material, applied with an ion nitridation treatment as the substrate treatment and then formed with a hard coating film of CrN by the following continuous treatment was used.

At first, nitridation was conducted in grow discharge by applying a DC voltage at 500 V using the test specimen (ring) as a cathode in a low pressure gas ($N_2+H_2$) atmosphere at 1066.4 Pa or lower. The thickness of the nitridation layer was 20 to 30 μm.

Successively, a hard film of CrN was formed to 2 μm thickness by using an arc discharge type ion plating apparatus.

Further, as a test specimen for comparative example, a ring having the same hard deposition film formed to the material with no prior substrate treatment was also provided.

Figure 16:
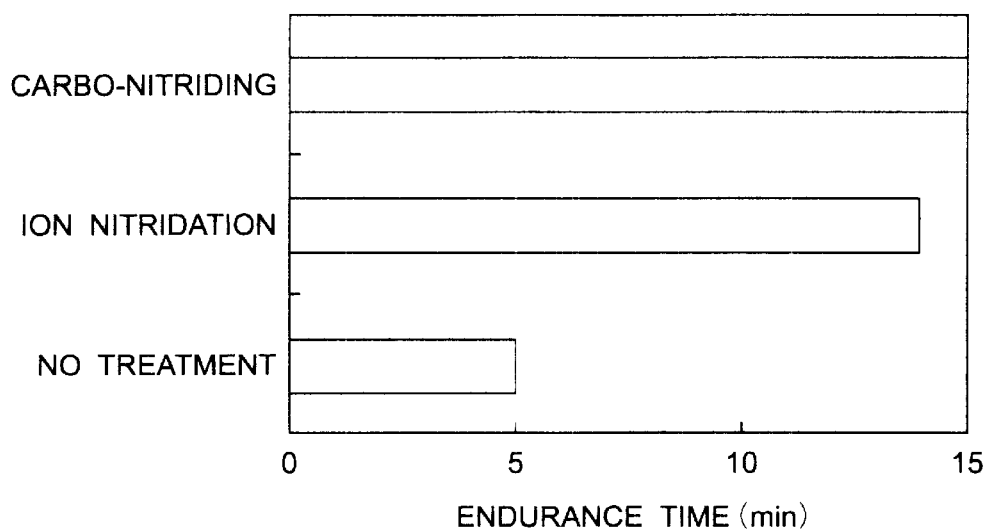
FIG. 16 is a graph showing the effect of the substrate treatment in the formation of the hard deposition film according to the present invention.

The result is shown in FIG. 16. While the seizing resistant effect is recognized also for the hard deposition film with no prior substrate treatment, the surface formed with the hard deposition film after applying nitridation to the substrate layer shows higher seizing resistance. It can be seen that the ion nitridation is preferred as the substrate treatment.

EXAMPLE

In the ball bearing shown in FIG. 14, a TiAlN hard deposition film 12 was formed to each surface of the inner ring groove 8 and the outer ring groove 9 of the bearing rings made of the same material as the SHX bearing with the deposition film thickness being 2.0 μm which is within a most preferred range of 0.5 to 8 μm and used as the test specimen for the example. On the other hand, the angular contact ball bearing 1 shown in FIG. 1 was used for the test specimen as the comparative example and the material for the inner and the outer rings were made of SUJ2 and hardened to surface hardness HV 760. This is about the same level of the surface hardness as the bearing ring of the example. The ball 4 was made of $Si_3N_4$.

Figure 17:
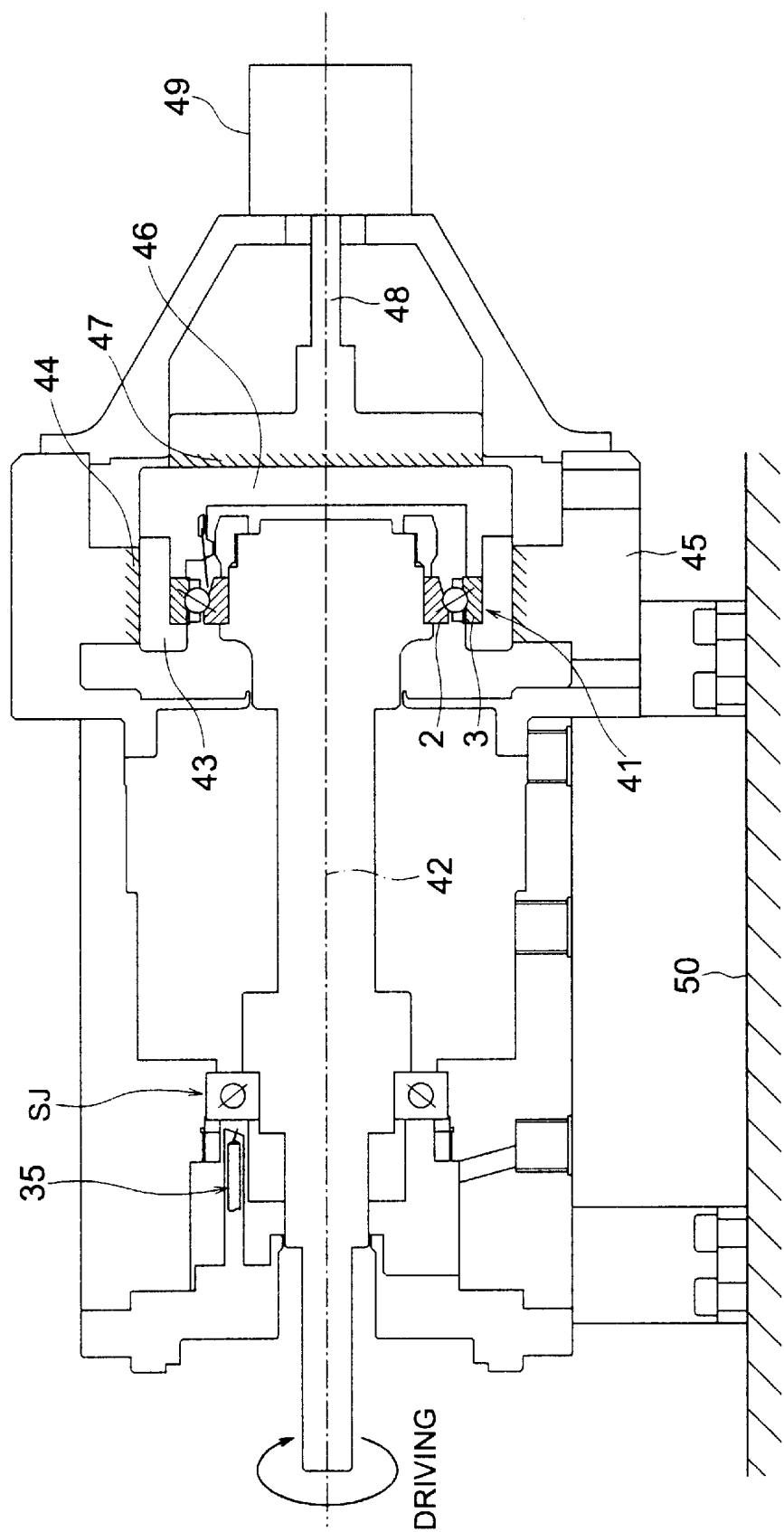
FIG. 17 is a schematic cross sectional view showing the entire structure of a kinetic torque tester for a ball bearing.

Referring to the size for each portion, the inner diameter of inner ring is 100 mm, the outer diameter of outer ring is 160 mm, the width was 24 mm, the ball pitch circle diameter is 132.5 mm and the radius of curvature for the inner ring groove 8 is 56.0% of the ball diameter da. The radius of curvature for the outer ring groove 9 is 52.0% of the ball diameter da. Further, the oil air lubrication was adopted for the lubrication system. A testing apparatus is shown in FIG. 17.

An inner ring 2 of a test specimen bearing 41 is fitted to a shaft 42. An outer ring 3 is fitted to a sleeve 43 and also supported in a radial direction by way of an air bearing 44 by an outer housing 45. The end face of the outer ring 3 abuts against the end face of a shaft sleeve 46, the shaft sleeve 46 is connected by way of an axial air bearing 47 to an axial adapter 48, and the axial adapter 48 is pressed in the axial direction by an air cylinder 49. An axial load can be loaded on the outer ring 3 of the test specimen bearing 41 with this constitution.

Figure 18:
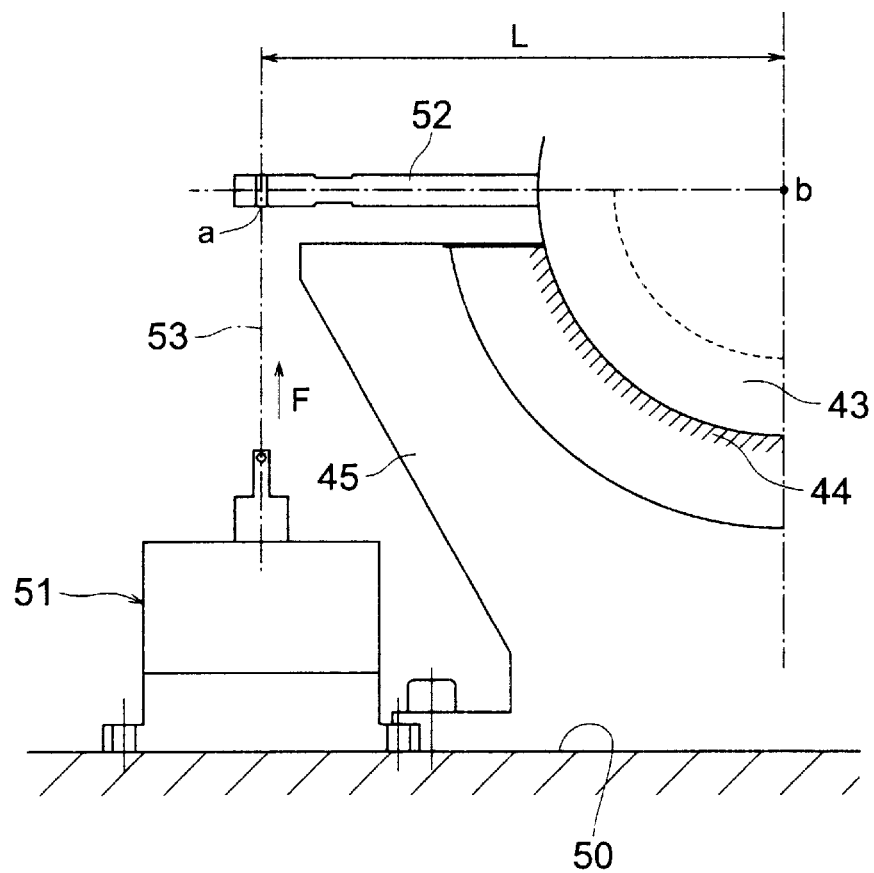
FIG. 18 is a fragmentary cross sectional view showing a kinetic torque measuring section of the tester.

FIG. 18 shows a measuring section for measuring axial torque. A load cell 51 attached to a base 50 and a torque lever 52 fixed to the sleeve 43 are connected by way of a wire 53. Since the sleeve 43 is supported in circumferential direction by way of the air bearing 44 by the outer housing 45, the circumferential friction component in the sleeve 43 fitted to the test specimen bearing 41 is negligible in this structure. The reference SJ in the drawing shows a support bearing. Further, 35 denotes an oil air nozzle.

When the inner ring 2 of the test specimen bearing 41 is rotated by the rotation of the shaft 42, the outer ring 3 outputs a force in the direction of inhibiting the rotation by way of the sleeve 43. The inhibiting force is measured by the load cell 51 through the torque lever 52 and the wire 53. Then, the bearing torque can be measured as a product of this force and the distance L between a wire clamping point a and a shaft center b of the torque lever 52.

Figure 19:
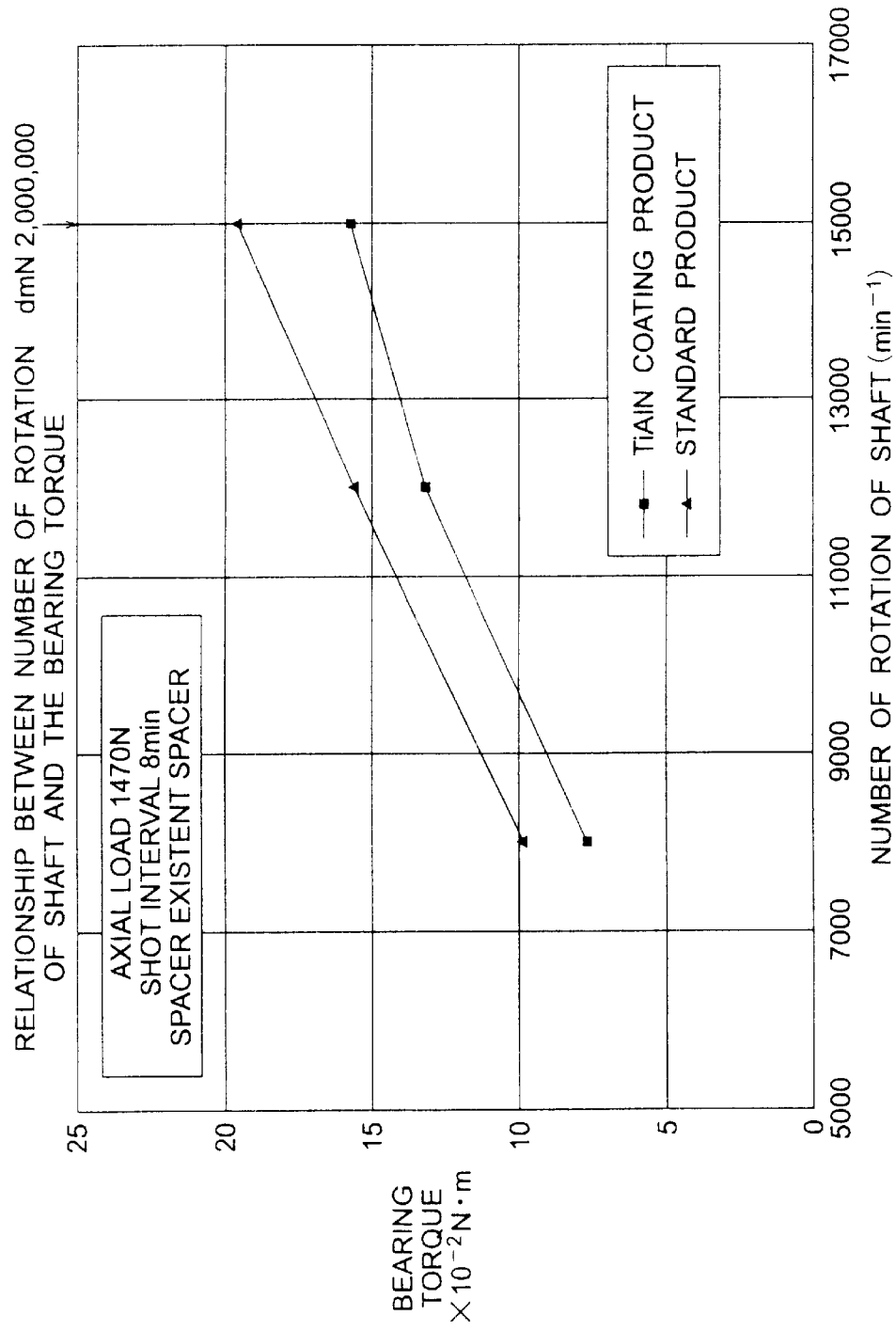
FIG. 19 is a graph for measuring a relation between the number of rotation of a shaft and a shaft torque for the products according to the present invention and comparative examples.

The test result is shown in FIG. 19. The torque is lower for the TiAlN coated ball bearing of the example compared with the hardened and tempered ball bearing made of SUJ2 of the comparative example, also at the number of rotation between 8,000 rpm (1,060,000 dmn) and 15,000 rpm (about 2,000,000 dmn). Accordingly, it is apparent that the ball bearing of the present invention having the hard deposition film 12 applied on the raceway surface of the outer ring and the inner ring causes less heat generation and has longer life also at a high speed rotation, particularly, at the dmn value of 2,000,000 or more.

Finally, the material for the ball of the present invention is described below.

The inventors of the present application could confirm by the following experiment that making the ball with ceramics as the rolling element of the ball bearing is particularly useful under a high speed operation condition at the dmn value of 2,000,000 or more.

The test apparatus shown in FIG. 12 described already was used in common. However, for adopting grease lubrication instead of oil air lubrication, the oil air nozzle 35 is removed and a grease nipple was attached through which grease was supplied during operation. Two test bearings 32 and 33 were used in FIG. 12, in which but the test bearing 32 on the left was selected as a representative, and the outer ring temperature thereof was measured by thermocouple 37 as a contact type thermoelectric thermometer. Also in this case, a saturation temperature for a predetermined period of time of one hour or more was measured.

Figure 20:
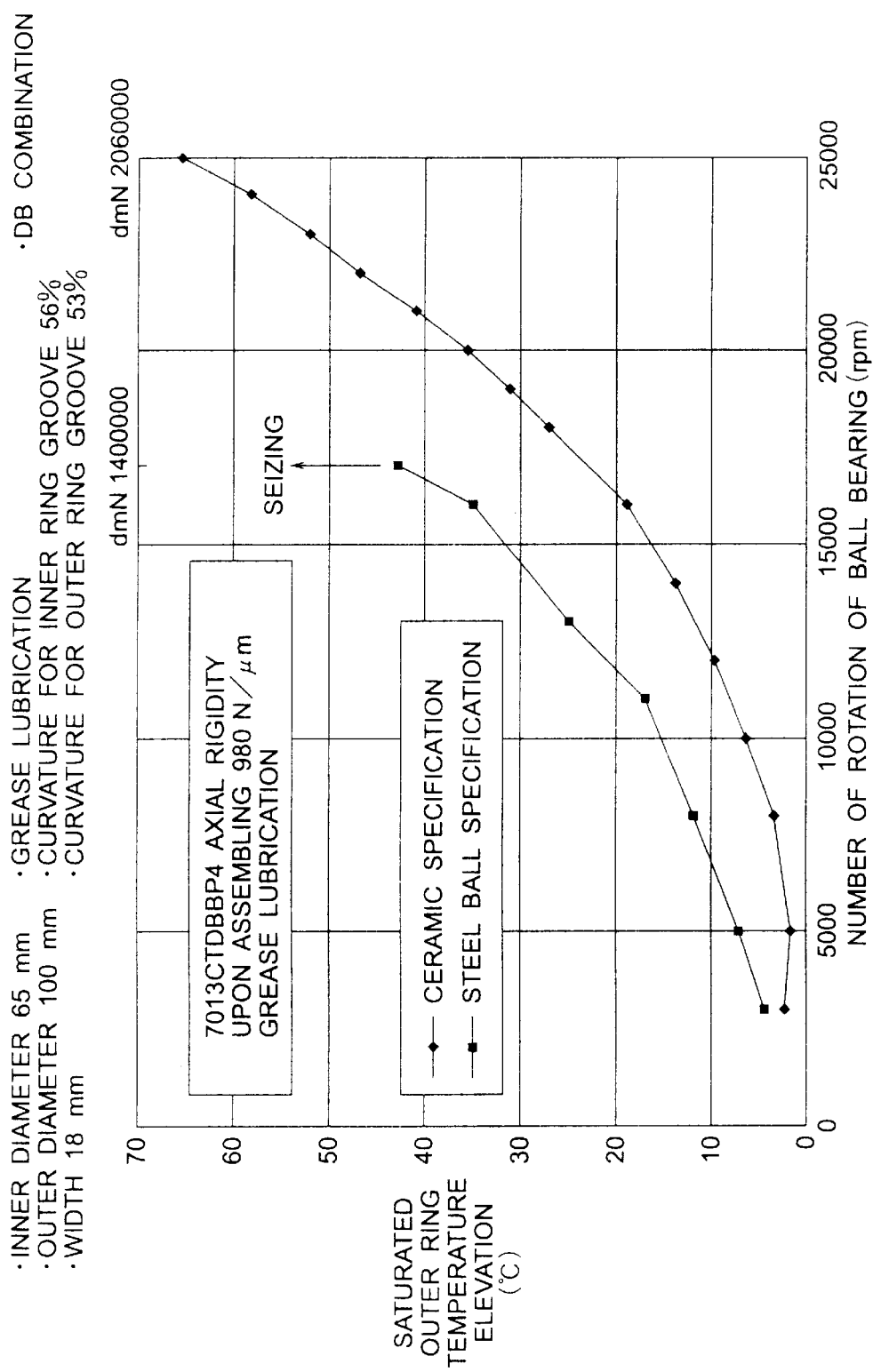
FIG. 20 is a graph showing a relation between the material for the ball and the number of rotation and the temperature elevation in the outer ring for products according to the present invention and comparative examples.

The result of the test is shown together with test conditions in FIG. 20.

Since the ball made of ceramics ($Si_3N_4$) has a lower density and higher heat resistance compared with the ball made of steel (SUJ2), it can further be free from the effect of a centrifugal force as the rotation speed goes higher. Usually, temperature elevation is remarkable particularly in the outer ring of the bearing under the intense effect of the centrifugal force and FIG. 20 also shows occurrence of seizing at about 1,400,000 dmn in the case of the ball made of SUJ2. On the other hand, it is shown that the ball made of $Si_3N_4$ can well withstand at 2,060,000 dmn (25,000 rpm) and even at temperature elevation.

As has been described above, in the ball bearing of the present invention, since the radius of curvature for the inner ring groove is defined within a range from 52.5 to 60.0% of the diameter of the ball and the radius of curvature for the outer ring groove is defined within a range from 50.5 to 53.0% of the diameter of the ball, it is possible to decrease the heat value in the inner ring and bring the heat value in the outer ring closer to the heat value in the inner ring and, thus, suppress the heat value in the entire ball bearing and, as a result, it is possible to prevent seizing of the ball bearing in a high speed rotation region, without using a large flow rate lubrication method or a preloading method such as constant preloading.

Particularly, since the ball diameter for the ball bearing is defined as from 0.32 to 0.60 times the value for: (outer diameter of outer ring—inner diameter of inner ring)/2, the ball diameter is smaller relative to the radial cross section of the ball bearing and, accordingly, the contact area relative to the grooves of the inner and outer rings is made appropriate to suppress increasing in the heat generation due to increase in the contact pressure and, as a result, seizing of the ball bearing in the high speed rotational region can be prevented.

More preferred embodiments can be obtained by narrowing the above-mentioned range for the ball diameter as 0.35 to 0.55 times and further narrowing as 0.39 to 0.48 times the value for: (outer diameter of outer ring—inner diameter of inner ring)/2.

Further, since the number of balls in the ball bearing according to the invention in is optimized as within a range: $1.1 \leq \{$pitch circle diameter$\times$sin $(180/$number of ball$)\}/$ball diameter$\leq 2.0$, it can prevent such a phenomenon that the stirring resistance of a lubricant in the bearing is increased due to excessive number of balls to increase the heat value or the load on the balls is increased due to insufficient number of balls to increase the contact pressure and increase the heat value and, as a result, breakage of the oil film or the like is caused to lower the life.

A more preferred embodiment is attained by defining the number of balls within a narrower range of from 1.2 to 1.8 which is narrower than the above-mentioned range.

Further, since the ingredient composition is optimized and the surface carbon concentration and the surface nitrogen concentration thereof are optimized for at least one of the inner ring and the outer ring made of steels in the ball bearing according to the present invention in any one of claims 1 to 6, lower friction and lower heat generation can be attained under high pressure and high shearing conditions during high speed rotation and, as a result, a sufficient bearing life can be attained, particularly, also in a small amount lubrication with less cooling effect such as oil-air lubrication, oil-mist lubrication and grease lubrication.

Further since the hard deposition film is applied to the surface of the raceway groove to reinforce the wear resistance in the ball bearing this can improve the wear resistance under high speed rotation at the dmn value of 2,000,000 or higher at which sliding or surface pressure increases at the contact point between the ball and the raceway groove and, as a result, the bearing life can be extended.

Further, since ceramics having higher module of elasticity than steels and, lower density and higher heat resistance than steels are used for the ball in the ball bearing the contact area in which the ball and the inner and outer rings are in contact with each other can be suppressed to suppress the heat value from the entire ball bearing more reliably, and it can also be free from the effect of the centrifugal force more as the speed goes higher. As a result, it could be confirmed that the trend of the temperature elevation at high speed can be moderated and the ball bearing made of steel balls were seized at about 1,400,000 dmn but ball bearings made of ceramic balls ($Si_3N_4$) could sufficiently withstand even under 2,060,000 dmn (25,000 rpm).

As has been described above, according to the present invention, a long life ball bearing having features such as excellent seizing resistance and wear resistance, reduced cost and less heat generation, which can be utilized suitably particularly for use in main spindles of high speed machine tools, at a dmn value of 2,000,000 or more can be provided.

What is claimed is:

1. A ball bearing comprising:
   a plurality of balls having a diameter disposed so as to roll between an inner ring and an outer ring, a groove of an arcuate cross section being formed in a circumferential direction of each of the inner ring and the outer ring in contact with the plurality of balls,
   wherein the arcuate groove of the inner ring is formed such that its radius of curvature is within a range of between 52.5% and 60.0% of the diameter of the balls,
   the arcuate groove of the outer ring is formed such that its radius of curvature is within a range of between 50.5% and 53.0% of the diameter of the balls, and
   the diameter of the balls is defined as 0.32 to 0.60 times the value for: (outer diameter of outer ring—inner diameter of inner ring)/2.

2. A ball bearing as defined in claim 1, wherein at least one of the inner ring and the outer ring has a hard deposition film with a thickness from 0.05 to 8 $\mu$m on a raceway surface.

3. A ball bearing as defined in claim 1, wherein the balls are made of ceramics.

4. A ball bearing as defined in claim 1, wherein at least one of the inner ring and the outer ring comprises a steel containing, by weight ratio, 0.2 to 1.2% of C, 0.7 to 1.5% of Si, 0.5 to 1.5% of Mo, 0.5 to 2.0% of Cr and the balance of Fe and inevitable impurity elements, in which a surface carbon concentration is defined as 0.8 to 1.3% and a surface nitrogen concentration is defined as 0.2 to 0.8%.

5. A ball bearing as defined in claim 4, wherein at least one of the inner ring and the outer ring has a hard deposition film with a thickness from 0.05 to 8 $\mu$m on a raceway surface.

6. A ball bearing as defined in claim 4, wherein the balls are made of ceramics.

7. A ball bearing as defined in claim 1, wherein the number of balls is satisfied by the formula: $1.1 \leq \{$pitch circle diameter$\times$sin $(180/$number of balls$)\}/$ball diameter$\leq 2.0$.

8. A ball bearing as defined in claim 7, wherein at least one of the inner ring and the outer ring has a hard deposition film with a thickness from 0.05 to 8 $\mu$m on a raceway surface.

9. A ball bearing as defined in claim 7, wherein the balls are made of ceramics.

10. A ball bearing as defined in claim 1, wherein the diameter of the balls is defined as 0.35 to 0.55 times the value for: (outer diameter of outer ring—inner diameter of inner ring)/2.

11. A ball bearing as defined in claim 10, wherein at least one of the inner ring and the outer ring has a hard deposition film with a thickness from 0.05 to 8 $\mu$m on a raceway surface.

12. A ball bearing as defined in claim 10, wherein the balls are composed of ceramics.

13. A ball bearing as defined in claim 10, wherein the number of balls is satisfied by the formula: $1.1 \leq \{$pitch circle diameter$\times$sin $(180/$number of balls$)\}/$ball diameter$\leq 2.0$.

14. A ball bearing as defined in claim 13, wherein at least one of the inner ring and the outer ring has a hard deposition film with a thickness from 0.05 to 8 $\mu$m on a raceway surface.

15. A ball bearing as defined in claim 13, wherein the balls are made of ceramics.

16. A ball bearing as defined in claim 1, wherein the diameter of the balls is defined as 0.39 to 0.48 times the value for: (outer diameter of outer ring—inner diameter of inner ring)/2.

17. A ball bearing as defined in claim 16, wherein at least one of the inner ring and the outer ring has a hard deposition film with a thickness from 0.05 to 8 μm on a raceway surface.

18. A ball bearing as defined in claim 16, wherein the balls are made of ceramics.

19. A ball bearing as defined in claim 16, wherein the number of balls is satisfied by the formula: $1.1 \leq \{$pitch circle diameter×sin (180/number of balls)$\}$/ball diameter$\leq 2.0$.

20. A ball bearing as defined in claim 19, wherein at least one of the inner ring and the outer ring has a hard deposition film with a thickness from 0.05 to 8 μm on a raceway surface.

21. A ball bearing as defined in claim 19, wherein the balls are made of ceramics.

22. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of between 52.5% and 60.0% of the diameter of the balls,
the arcuate groove of the outer ring is formed such that its radius of curvature is within a range of between 50.5% and 53.0% of the diameter of the balls, and
wherein the number of balls is satisfied with the formula: $1.1 \leq \{$pitch circle diameter×sin (180/number of balls)$\}$/ball diameter$\leq 2.0$.

23. A ball bearing as defined in claim 22, wherein at least one of the inner ring and the outer ring comprises a steel containing, by weight ratio, 0.2 to 1.2% of C, 0.7 to 1.5% of Si, 0.5 to 1.5% of Mo, 0.5 to 2.0% of Cr and the balance of Fe and inevitable impurity elements, in which a surface carbon concentration is defined as 0.8 to 1.3% and a surface nitrogen concentration is defined as 0.2 to 0.8%.

24. A ball bearing as defined in claim 22, wherein at least one of the inner ring and the outer ring has a hard deposition film with a thickness from 0.05 to 8 μm on a raceway surface.

25. A ball bearing as defined in claim 22, wherein the balls are made of ceramics.

26. A ball bearing as defined in claim 22, wherein the number of balls is satisfied with the formula: $1.2 \leq \{$pitch circle diameter×sin (180/number of balls)$\}$/ball diameter$\leq 1.8$.

27. A ball bearing as defined in claim 26, wherein at least one of the inner ring and the outer ring has a hard deposition film with a thickness from 0.05 to 8 μm on a raceway surface.

28. A ball bearing as defined in claim 17, wherein the balls are made of ceramics.

29. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of between 54.0% and 57.0% of the diameter of the balls, and
wherein the diameter of the balls is defined as 0.32 to 0.60 times the value for: (outer diameter of outer ring—inner diameter of inner ring)/2.

30. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of between 54.0% and 57.0% of the diameter of the balls, and
wherein the number of balls is satisfied with the formula: $1.1 \leq \{$pitch circle diameter×sin (180/number of balls)$\}$/ball diameter$\leq 2.0$.

31. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of between 54.0% and 57.0% of the diameter of the balls, and
wherein at least one of the inner ring and the outer ring comprises a steel containing, by weight ratio, 0.2 to 1.2% of C, 0.7 to 1.5% of Si, 0.5 to 1.5% of Mo, 0.5 to 2.0% of Cr and the balance of Fe and inevitable impurity elements, in which a surface carbon concentration is defined as 0.8 to 1.3% and a surface nitrogen concentration is defined as 0.2 to 0.8%.

32. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of between 54.0% and 57.0% of the diameter of the balls, and
wherein at least one of the inner ring and the outer ring has a hard deposition film with a thickness from 0.05 to 8 μm on a raceway surface.

33. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of between 54.0% and 57.0% of the diameter of the balls, and
wherein the balls are made of ceramics.

34. A ball bearing comprising:
a plurality of balls having a diameter disposed so as to roll between an inner ring and an outer ring, a groove of an arcuate cross section being formed in a circumferential direction of each of the inner ring and the outer ring in contact with the plurality of balls,
wherein the arcuate groove of the inner ring is formed such that its radius of curvature is within a range of 52.5% and 60.0% of the diameter of the balls, the arcuate groove of the outer ring is formed such that its radius of curvature is within a range of 50.5% and 53.0% of the diameter of the balls, and wherein at least one of the inner ring and the outer ring comprises a steel containing, by weight ratio, 0.2 to 1.2% of C, 0.7 to 1.5% of Si, 0.5 to 1.5% of Mo, 0.5 to 2.0% of Cr and the balance of Fe and inevitable impurity elements, in which a surface carbon concentration is defined as 0.8 to 1.3% and a surface nitrogen concentration is defined as 0.2 to 0.8%.

* * * * *